(12) United States Patent
Harada et al.

(10) Patent No.: US 11,125,321 B2
(45) Date of Patent: *Sep. 21, 2021

(54) GEAR SHIFT CONTROL DEVICE FOR AUTOMATIC TRANSMISSION DEVICE

(71) Applicant: AISIN SEIKI KABUSHIKI KAISHA, Kariya (JP)

(72) Inventors: Koji Harada, Kariya (JP); Futoshi Hattori, Kariya (JP); Kenji Aoki, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,304

(22) Filed: Apr. 28, 2020

(65) Prior Publication Data

US 2020/0362961 A1 Nov. 19, 2020

(30) Foreign Application Priority Data

May 16, 2019 (JP) .............................. JP2019-093165

(51) Int. Cl.
*F16H 61/00* (2006.01)
*F16H 61/06* (2006.01)
*B60W 10/02* (2006.01)
*F16D 48/02* (2006.01)
(Continued)

(52) U.S. Cl.
CPC ......... *F16H 61/0021* (2013.01); *F16H 59/18* (2013.01); *F16H 2059/147* (2013.01)

(58) Field of Classification Search
CPC .... F16H 61/0021; F16H 61/065; F16H 59/18; F16H 2059/147; B60W 10/02; B60W 10/023; B60W 2710/023; B60W 2510/108; B60W 2510/1085; F16D 25/14
See application file for complete search history.

(56) References Cited

U.S. PATENT DOCUMENTS 8,337,362 B2 * 12/2012 Inagaki ............... B60W 10/026
477/175
2009/0271081 A1 10/2009 Watanabe et al.
(Continued)

FOREIGN PATENT DOCUMENTS

JP 2003130204 A * 5/2003
JP 2004316845 A 11/2004
(Continued)

*Primary Examiner* — Tisha D Lewis
(74) *Attorney, Agent, or Firm* — Buchanan Ingersoll & Rooney PC

(57) ABSTRACT

A gear shift control device for an automatic transmission device includes a transmission including an output unit setting and outputting a target value of the hydraulic pressure to the hydraulic control device. The output unit, when the shift stage is changed from a shift stage to another, increases the target value for a first friction coupling portion in the decoupled state in the shift stage to a first value, reduces to a second value, increases to a third value after the value is reduced to the second value, sets to a fourth value after the value is increased to the third value, and sets to a fifth value after the target value is set to the fourth value, and the output unit sets the fourth value according to magnitude of input torque to the transmission.

1 Claim, 15 Drawing Sheets

(51) Int. Cl.
*F16H 59/18* (2006.01)
*F16H 59/14* (2006.01)

(56) References Cited

U.S. PATENT DOCUMENTS

| | | | | |
|---|---|---|---|---|
| 2012/0290163 A1* | 11/2012 | Inagaki | ................... | B60L 7/18 |
| | | | | 701/22 |
| 2018/0023699 A1* | 1/2018 | Fujiwara | ............ | F16H 61/0437 |
| | | | | 701/58 |
| 2019/0061738 A1* | 2/2019 | Goto | ................... | B60W 10/06 |

FOREIGN PATENT DOCUMENTS

| | | | | | |
|---|---|---|---|---|---|
| JP | 2008111541 A | | 5/2008 | | |
| JP | 2013032793 A | * | 2/2013 | ............ | F16H 61/04 |
| JP | 2018112234 A | * | 7/2018 | | |

* cited by examiner

|  | C1 | C2 | C3 | B1 | B2 |
|---|---|---|---|---|---|
| FIRST SPEED | ○ |  |  |  | ○ |
| SECOND SPEED | ○ |  |  | ○ |  |
| THIRD SPEED | ○ |  | ○ |  |  |
| FOURTH SPEED | ○ | ○ |  |  |  |
| FIFTH SPEED |  | ○ | ○ |  |  |
| SIXTH SPEED |  | ○ |  | ○ |  |
| R |  |  | ○ |  | ○ |

COUPLED-SIDE INSTRUCTION HYDRAULIC PRESSURE

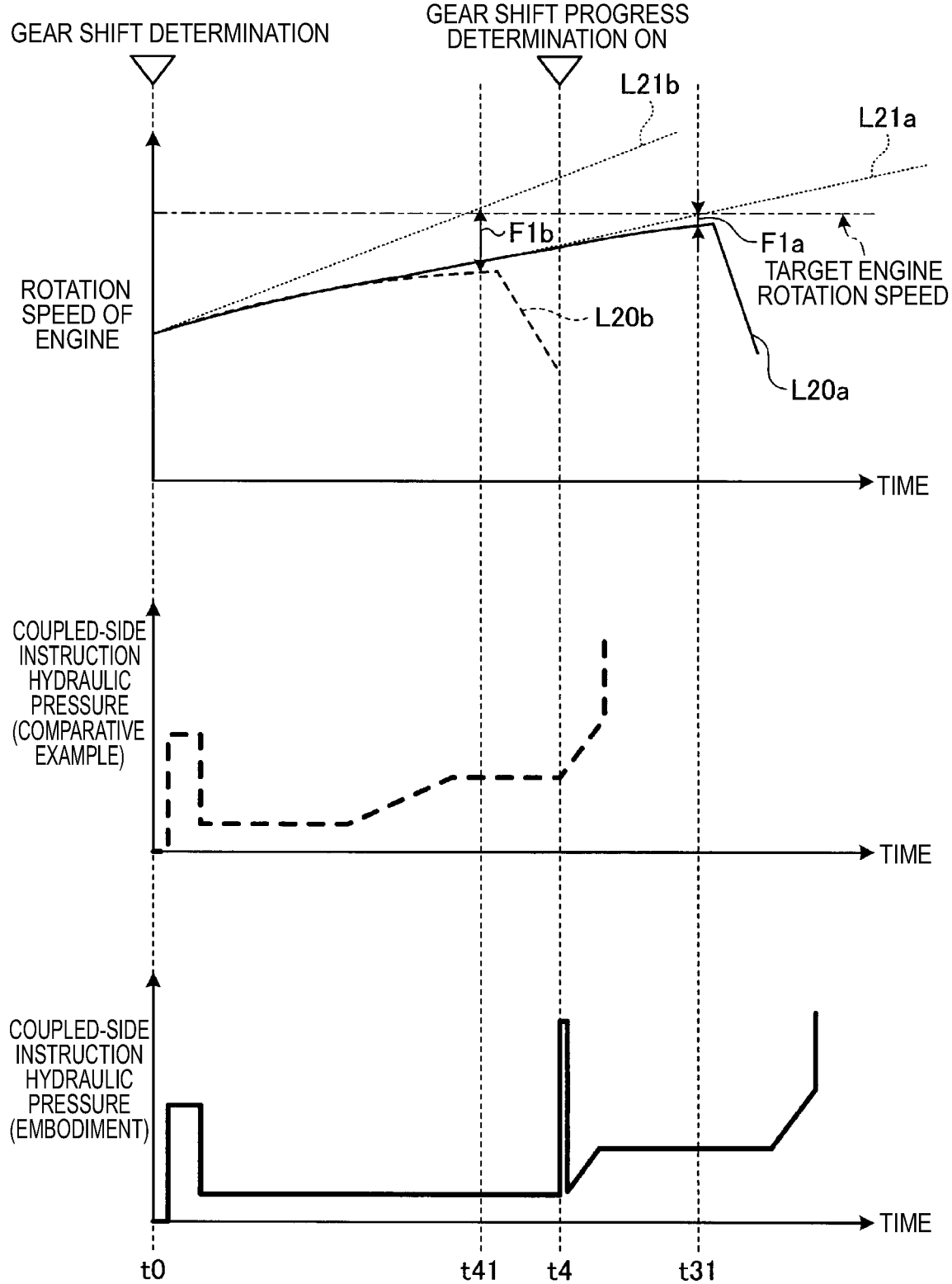

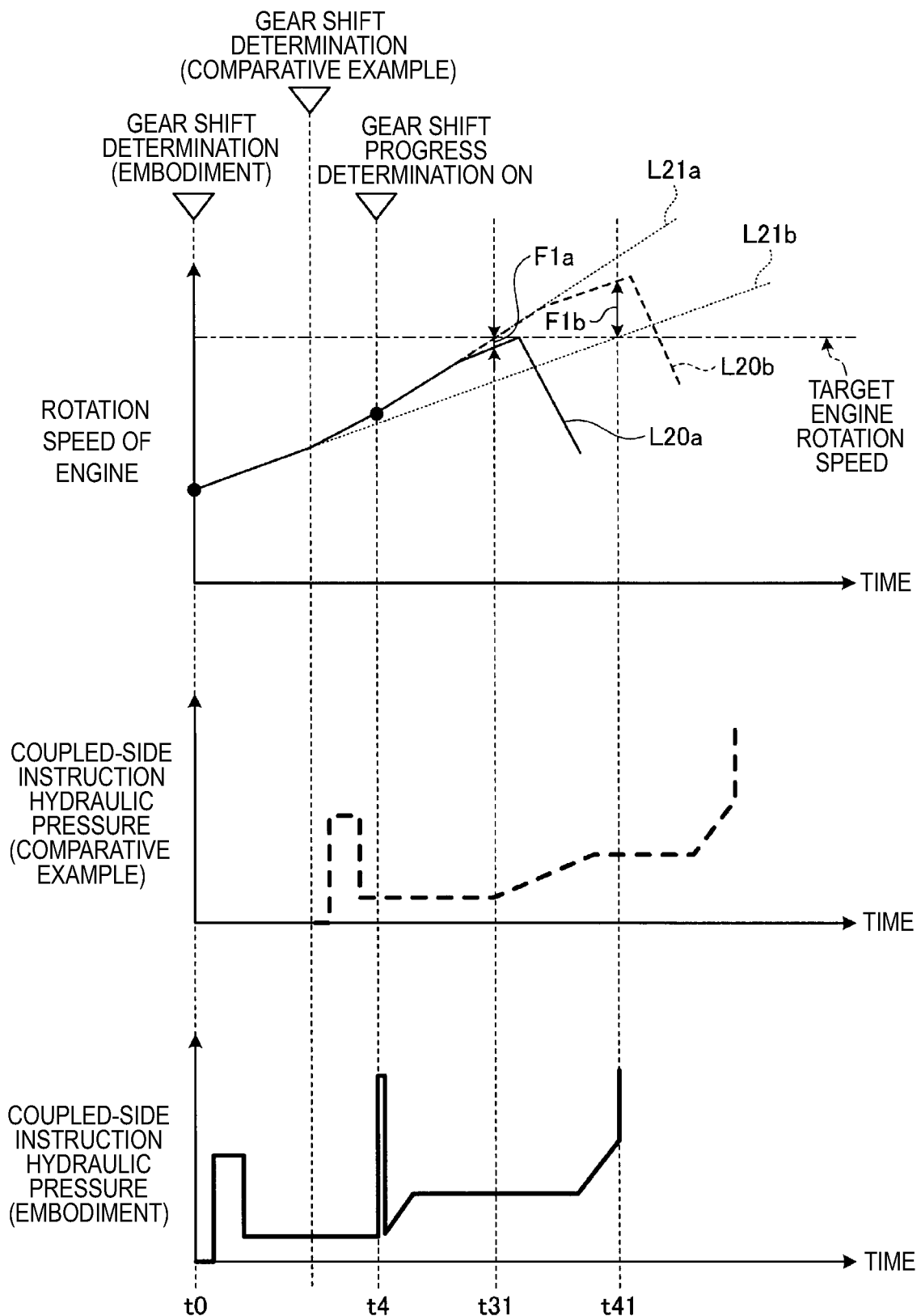

GEAR SHIFT CONTROL DEVICE FOR AUTOMATIC TRANSMISSION DEVICE

CROSS REFERENCE TO RELATED APPLICATIONS

This application is based on and claims priority under 35 U.S.C. § 119 to Japanese Patent Application 2019-093165, filed on May 16, 2019, the entire contents of which are incorporated herein by reference.

TECHNICAL FIELD

An embodiment of this disclosure relates to a gear shift control device for an automatic transmission device.

BACKGROUND DISCUSSION

In the related art, a gear shift control device is provided that performs gear shift control over a transmission including a plurality of friction coupling portions that change between a coupled state and a decoupled state by a hydraulic pressure to be applied, and having a plurality of shift stages corresponding to combinations of the coupled state and the decoupled state of the plurality of friction coupling portions.

Examples of the related art include JP 2004-316845A (Reference 1) and JP 2008-111541A (Reference 2).

In the related art, when a shift shock occurs in a change of the shift stage, it may be difficult to identify a cause of the shift shock.

SUMMARY

An aspect of this disclosure provides a gear shift control device for an automatic transmission device including a transmission that includes a plurality of friction coupling portions which change, according to a hydraulic pressure, between a coupled state in which a first coupling target and a second coupling target are coupled by frictional force and a decoupled state in which the first coupling target and the second coupling target are decoupled and that has a plurality of shift stages corresponding to combinations of the coupled states and the decoupled states of the plurality of friction coupling portions, and a hydraulic control device that controls the hydraulic pressure, the gear shift control device includes, for example, a determination unit that determines a change of the shift stage; and an output unit that sets a target value of the hydraulic pressure and outputs the target value to the hydraulic control device, the output unit, when the determination unit determines to change the shift stage from a certain shift stage to another shift stage, increases the target value for a first friction coupling portion, which is the friction coupling portion in the decoupled state in the certain shift stage, to a first value, then reduces the target value to a second value that is smaller than the first value, increases the target value to a third value that is larger than the second value after the target value is reduced to the second value, sets the target value to a fourth value that is smaller than the third value after the target value is increased to the third value, and sets the target value to a fifth value that is equal to or larger than the fourth value and that generates the frictional force after the target value is set to the fourth value, and the output unit sets the fourth value according to magnitude of input torque to the transmission.

BRIEF DESCRIPTION OF THE DRAWINGS

The foregoing and additional features and characteristics of this disclosure will become more apparent from the following detailed description considered with the reference to the accompanying drawings, wherein:

FIG. 17 is a timing chart showing the processing of FIG. 11 executed by the gear shift processing unit of the gear shift control device according to the embodiment and a processing according to a comparative example, and is a diagram when a change rate of the rotation speed of the engine is reduced during gear shift control; and FIG. 18 is a timing chart showing the processing of FIG. 11 executed by the gear shift processing unit of the gear shift control device according to the embodiment and a processing according to the comparative example, and is a diagram when the change rate of the rotation speed of the engine is increased during the gear shift control.

DETAILED DESCRIPTION

Hereinafter, an exemplary embodiment disclosed here will be disclosed. A configuration of the embodiment shown below and operations and effects provided by the configuration are examples. This disclosure can be implemented by a configuration other than the configuration disclosed in the following embodiment. According to this disclosure, at least one of various effects (including derived effects) obtained by the configuration can be obtained.

<Overall Configuration>

Figure 1:
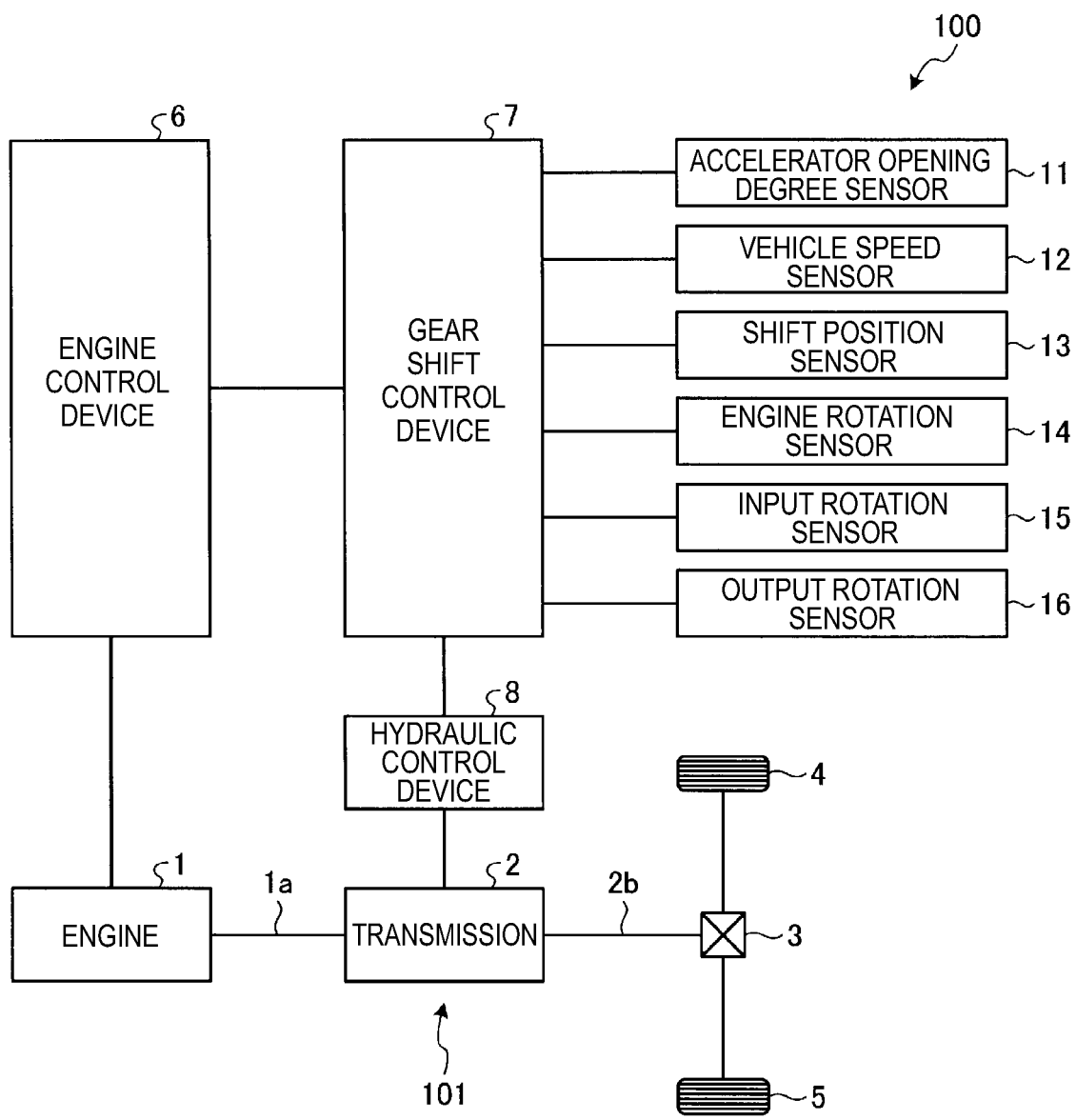
FIG. 1 is an exemplary diagram of a configuration of a vehicle according to an embodiment.

FIG. 1 is an exemplary diagram of a configuration of a vehicle 100 according to the embodiment. As shown in FIG. 1, the vehicle 100 includes, as a drive system configuration, an engine 1, a transmission 2, a differential mechanism 3, and wheels 4 and 5. Power output from the engine 1 is transmitted to the wheels 4 and 5 via the transmission 2 and the differential mechanism 3. In the embodiment, an example is shown in which the vehicle 100 includes only the engine 1 as a drive source, but this disclosure is not limited thereto. For example, the vehicle 100 may be a hybrid vehicle including the engine 1 and a motor as a power source, or an electric vehicle including only a motor as the drive source.

The vehicle 100 includes, as a control system configuration, an engine control device 6, a gear shift control device 7, and a hydraulic control device 8. The engine control device 6 is communicably connected to the engine 1 and controls the engine 1. The gear shift control device 7 is communicably connected to the hydraulic control device 8 and controls the hydraulic control device 8. The hydraulic control device 8 controls a hydraulic pressure, which is a pressure of oil in the transmission 2, according to control of the gear shift control device 7. That is, the gear shift control device 7 controls the transmission 2 by controlling the hydraulic control device 8. The transmission 2, the gear shift control device 7, and the hydraulic control device 8 constitute an automatic transmission device 101. Oil is also called hydraulic oil.

The vehicle 100 includes, as a detection system configuration, an accelerator opening degree sensor 11, a vehicle speed sensor 12, a shift position sensor 13, an engine rotation sensor 14, an input rotation sensor 15, and an output rotation sensor 16.

<Each Configuration>

The engine 1 is an internal combustion engine that explodes and burns fuel in a cylinder and generates rotation power (torque) by thermal energy. The engine 1 has an output shaft 1a connected to the transmission 2, and the rotation power output from the output shaft 1a is input to the transmission 2.

The transmission 2 is provided on a power transmission path between the engine 1 and the differential mechanism 3. The transmission 2 can reduce rotation of the engine 1 and transmit the rotation to the differential mechanism 3.

Figures 2, 3:
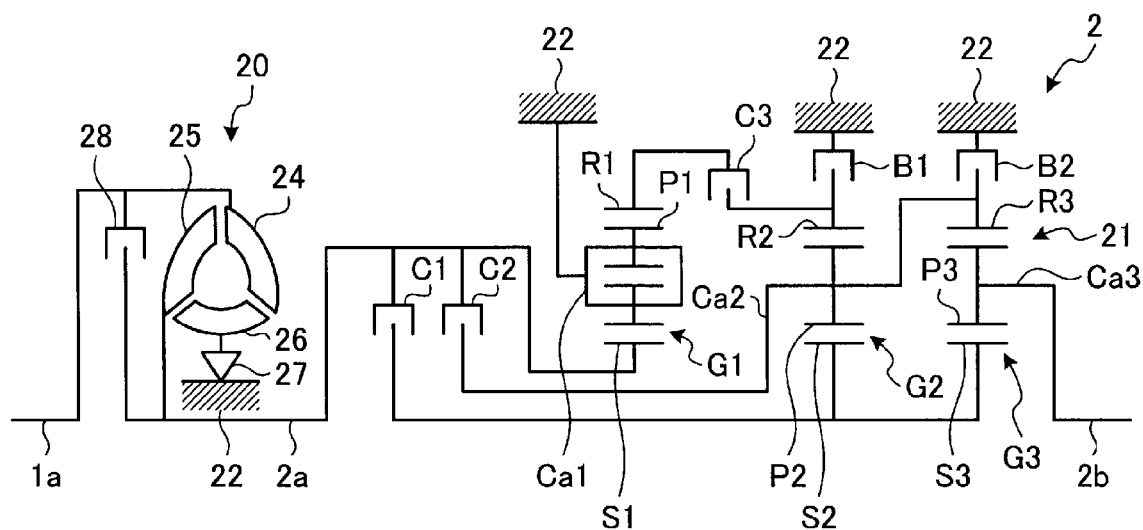
FIG. 2 is an exemplary skeleton diagram of a transmission according to the embodiment.
FIG. 3 is a table showing an example of operation states of respective friction coupling portions in each shift stage of the transmission according to the embodiment.

FIG. 2 is an exemplary skeleton diagram of the transmission 2 according to the embodiment. As shown in FIG. 2, the transmission 2 includes a torque converter 20, a transmission mechanism 21, and a case 22. The torque converter 20 and the transmission mechanism 21 are housed in the case 22. The case 22 is supported by a vehicle body (not shown) of the vehicle 100.

The torque converter 20 is provided on the power transmission path between the output shaft 1a of the engine 1 and an input shaft 2a of the transmission mechanism 21. The torque converter 20 generates a torque amplification effect by utilizing a mechanical action of fluid. The torque converter 20 is also called a fluid transmission device.

The torque converter 20 includes a pump impeller 24, a turbine runner 25, a stator 26, a one-way clutch 27, and a lock-up clutch 28.

The pump impeller 24 rotates integrally with the output shaft 1a of the engine 1. The pump impeller 24 sends out oil toward the turbine runner 25 by rotating.

The turbine runner 25 rotates integrally with the input shaft 2a of the transmission mechanism 21. In addition, the turbine runner 25 is rotatable relative to the pump impeller 24. The turbine runner 25 receives oil sent out from the pump impeller 24 and rotates. In addition, the turbine runner 25 rotates integrally with the pump impeller 24 when the lock-up clutch 28 is brought into a coupled state.

The stator 26 rectifies oil sent out from the turbine runner 25 and returns the oil to the pump impeller 24 to generate a torque amplification effect. The stator 26 is fixed to the case 22 via the one-way clutch 27. The one-way clutch 27 allows the stator 26 to rotate only in one direction.

The lock-up clutch 28 changes according to the hydraulic pressure controlled by the hydraulic control device 8 between the coupled state in which the pump impeller 24 and the turbine runner 25 are coupled and a decoupled state in which the pump impeller 24 and the turbine runner 25 are decoupled. When the lock-up clutch 28 is in the coupled state, there is no rotational speed difference between the output shaft 1a of the engine 1 and the input shaft 2a of the transmission mechanism 21. In the coupled state, the lock-up clutch 28 transmits the rotation of the output shaft 1a to the input shaft 2a of the transmission mechanism 21.

When the lock-up clutch 28 is in the decoupled state, the torque converter 20 generates a torque amplification effect by a rotation difference between the pump impeller 24 to which torque is input from the output shaft 1a and the turbine runner 25 that outputs the torque to the input shaft 2a.

The transmission mechanism 21 includes a plurality of shift stages corresponding to a plurality of power transmission paths. The transmission mechanism 21 switches the shift stages by switching power transmission paths. The transmission mechanism 21 includes, as members forming the power transmission path, the input shaft 2a, a plurality of planetary gears G1 to G3, a plurality of friction coupling portions C1 to C3, B1 and B2, and an output shaft 2b.

The planetary gear G1 includes a sun gear S1, a ring gear R1, a double pinion gear P1, and a carrier Ca1. The sun gear S1 rotates integrally with the input shaft 2a. The ring gear R1 is positioned on an outer peripheral side of the sun gear S1 and is connected to the friction coupling portion C3. The double pinion gear P1 is interposed between the sun gear S1 and the ring gear R1. The carrier Ca1 rotatably supports the double pinion gear P1 and is fixed to the case 22.

The planetary gear G2 includes a sun gear S2, a ring gear R2, a pinion gear P2, and a carrier Ca2. The sun gear S2 is connected to the friction coupling portion C1. The ring gear R2 is positioned on an outer peripheral side of the sun gear S2 and is connected to the friction coupling portion C3 and the friction coupling portion B1. The pinion gear P2 is interposed between the sun gear S2 and the ring gear R2. The carrier Ca2 rotatably supports the pinion gear P2 and is connected to the friction coupling portion C2 and the friction coupling portion B2.

The planetary gear G3 includes a sun gear S3, a ring gear R3, a pinion gear P3, and a carrier Ca3. The sun gear S3 is connected to the friction coupling portion C1. The ring gear R3 is positioned on an outer peripheral side of the sun gear S3 and is connected to the friction coupling portion B2. In addition, the ring gear R3 is connected to the carrier Ca2 of the planetary gear G2 and rotates integrally with the carrier Ca2. The pinion gear P3 is interposed between the sun gear S3 and the ring gear R3. The carrier Ca3 rotatably supports the pinion gear P3. In addition, the carrier Ca3 is connected to the output shaft 2b and rotates integrally with the output shaft 2b.

The friction coupling portions C1 to C3, B1 and B2 can switch between the coupled state in which two coupling targets of the transmission mechanism 21 are coupled by frictional force and the decoupled state in which the two coupling targets are decoupled. The coupled state is a connection state in which the two coupling targets are connected by the frictional force, and the decoupled state is a separated state in which the two coupling targets are separated. The decoupled state is also called a released state. The friction coupling portions C1 to C3 are called clutches, and switch between coupling and decoupling between two rotating elements as two coupling targets. The friction coupling portions B1 and B2 are called brakes, and switch between the coupling and disconnection between the rotating element and a fixed element as two coupling targets. In the example of FIG. 2, components of the input shaft 2a and the planetary gears G1 to G3 are examples of the rotating elements that are coupling and decoupling targets of the friction coupling portions C1 to C3, B1 and B2. The case 22 is an example of the fixed element that is a coupling and decoupling target of the friction coupling portions B1 and B2.

Specifically, in the example of FIG. 2, the friction coupling portion C1 switches between the coupling and decoupling between the input shaft 2a and the sun gear S1 of the planetary gear G1, and the sun gear S2 of the planetary gear G2 and the sun gear S3 of the planetary gear G3. The friction coupling portion C2 switches between the coupling and decoupling between the input shaft 2a and the sun gear S1 of the planetary gear G1, and the carrier Ca2 of the planetary gear G2 and the ring gear R3 of the planetary gear G3. The friction coupling portion C3 switches between the coupling and decoupling between the ring gear R1 of the planetary gear G1 and the ring gear R2 of the planetary gear G2. The friction coupling portion B1 switches between the coupling and decoupling between the ring gear R2 of the planetary gear G2 and the case 22. The friction coupling portion B2 switches between the coupling and decoupling between the carrier Ca2 of the planetary gear G2 and the case 22 and the ring gear R3 of the planetary gear G3, and the case 22.

FIG. 3 is a table showing an example of operation states of the plurality of friction coupling portions C1 to C3, B1 and B2 in each shift stage of the transmission 2 according to the embodiment. The transmission mechanism 21 has a plurality of shift stages with different gear ratios (the gear ratio=a rotation speed of the input shaft 2a/a rotation speed of the output shaft 2b). Specifically, the transmission mechanism 21 has forward shift stages of first speed to sixth speed and a reverse shift stage. In other words, the transmission mechanism 21 has six forward shift stages and one reverse shift stage. The gear ratio of the shift stage decreases in an order from the forward first speed to the forward sixth speed. These shift stages are switched by combinations of the coupled state and the decoupled state of the friction coupling portions C1 to C3, B1 and B2. In FIG. 3, the forward shift stages of the first speed to sixth speed are indicated by "first speed" to "sixth speed", the reverse shift stage is indicated by "R", and the friction coupling portions C1 to C3, B1 and B2 are indicated by "C1" to "C3", "B1" and "B2". In FIG. 3, in a row corresponding to the respective shift stages of the forward first speed to sixth speed and the reverse shift stage, the friction coupling portions C1 to C3, B1 and B2 marked with a circle ○ are in the coupled state, and the unmarked friction coupling portions C1 to C3, B1 and B2 are in the decoupled state.

In the shift stage of the first speed, the friction coupling portions C1 and B2 are in the coupled state, and the friction coupling portions C2, C3 and B1 are in the decoupled state. In the shift stage of the second speed, the friction coupling portions C1 and B1 are in the coupled state, and the friction coupling portions C2, C3 and B2 are in the decoupled state. In the shift stage of the third speed, the friction coupling portions C1 and C3 are in the coupled state, and the friction coupling portions C2, B1 and B2 are in the decoupled state. In the shift stage of the fourth speed, the friction coupling portions C1 and C2 are in the coupled state, and the friction coupling portions C3, B1 and B2 are in the decoupled state. In the shift stage of the fifth speed, the friction coupling portions C2 and C3 are in the coupled state, and the friction coupling portions C1, B1 and B2 are in the decoupled state. In the shift stage of the sixth speed, the friction coupling portions C2 and B1 are in the coupled state, and the friction coupling portions C1, C3 and B2 are in the decoupled state. In the reverse shift stage, the friction coupling portions C3 and B2 are in the coupled state, and the friction coupling portions C1, C2 and B1 are in the decoupled state.

The transmission 2 switches the shift stages by switching combinations in which the rotating element or the fixed element are connected by controlling the friction coupling portions C1 to C3, B1, and B2. Specifically, the gear shift control device 7 controls switching of the shift stage via the hydraulic control device 8. Hereinafter, a friction coupling portion CB may be used as a general term for the friction coupling portions C1 to C3, B1, and B2. In the gear shift, the friction coupling portion CB that changes from the coupled state to the decoupled state is called the released-side friction coupling portion CB, and the friction coupling portion CB that changes from the decoupled state to the coupled state is called the coupled-side friction coupling portion CB.

Figure 4:
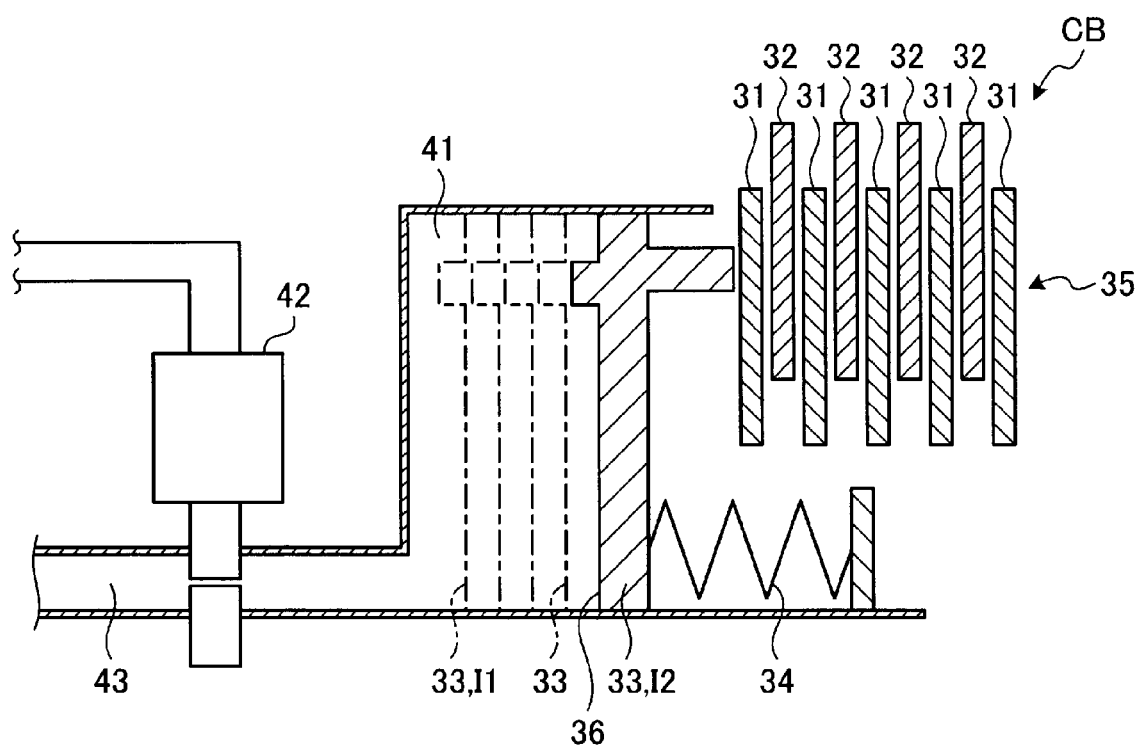
FIG. 4 is a diagram schematically and exemplarily showing a configuration of the friction coupling portion of the transmission according to the embodiment.

FIG. 4 is a diagram schematically and exemplarily showing a configuration of the friction coupling portion CB of the transmission 2 according to the embodiment. As shown in FIG. 4, the friction coupling portion CB includes a plurality of inner side friction plates 31, a plurality of outer side friction plates 32, a piston 33, and a return spring 34.

The inner side friction plate 31 is formed in an annular shape around a central shaft. The inner side friction plate 31 is coupled to the other of the two components of the transmission 2 so as not to be relatively rotatable, and is provided to be movable in an axial direction of the central shaft with respect to the other component. A movement of the inner side friction plate 31 in the axial direction of the central shaft is limited within a prescribed range.

An outer side friction plate 32 is formed in an annular shape around on the central shaft. The outer side friction plate 32 is coupled to the other of the two components of the transmission 2 so as not to be relatively rotatable, and is provided to be movable in the axial direction of the central shaft with respect to the other component. A movement of the outer side friction plate 32 in the axial direction of the central shaft is limited within a prescribed range.

The plurality of inner side friction plates 31 and the plurality of outer side friction plates 32 are alternately positioned in the axial direction of the central shaft. The plurality of inner side friction plates 31 and the plurality of outer side friction plates 32 form a friction plate group 35. The inner side friction plates 31 are positioned, for example, at both ends of the friction plate group 35 in the axial direction.

The piston 33 is provided at a position facing the friction plate group 35 in the axial direction. That is, the piston 33 faces the inner side friction plate 31, which is positioned at one end of the friction plate group 35 in the axial direction, in the axial direction of the central shaft. The piston 33 is movable in the axial direction of the central shaft. The piston 33 faces an oil chamber 41 provided on a side opposite to the friction plate group 35 with respect to the piston. The piston 33 is pressed in a direction toward the friction plate group 35 by a pressure of oil supplied to the oil chamber 41. The piston 33 forms a servo (hydraulic servo) 36.

The return spring 34 presses the piston 33 in a direction along the axial direction of the central shaft and away from the friction plate group 35. The return spring 34 is an example of an elastic member.

In the friction coupling portion CB with such a configuration, when force pressing the piston 33 by the hydraulic pressure of the oil chamber 41 is larger than force pressing the piston 33 by the return spring 34 from a state in which the piston 33 is separated from the friction plate group 35, the piston 33 moves in a direction toward the friction plate group 35, contacts the inner side friction plate 31 positioned at one end of the friction plate group 35 in the axial direction, and pushes the inner side friction plate 31. Accordingly, the plurality of inner side friction plates 31 and the plurality of outer side friction plates 32 are integrated by the frictional force generated between adjacent inner side friction plates 31 and outer side friction plates 32, and the two coupling targets in the transmission 2 are coupled. On the other hand, when the force pressing the piston 33 by the hydraulic pressure of the oil chamber 41 is smaller than the force pressing the piston 33 by the return spring 34 from a state in which the piston 33 is in contact with the friction plate group 35, the piston 33 moves in a direction away from the friction plate group 35, and is separated from the inner side friction plate 31 positioned at one end of the friction plate group 35 in the axial direction. Accordingly, the frictional force is not generated between the plurality of inner side friction plates 31 and the plurality of outer side friction plates 32, and the two coupling targets in the transmission 2 are decoupled (separated).

The description returns to FIG. 1. The hydraulic control device 8 switches a passage (oil passage) of oil introduced from a hydraulic pump (not shown) and adjusts the hydraulic pressure according to the control of the gear shift control device 7, and outputs oil toward the selected friction coupling portions C1 to C3, B1 and B2 and the lock-up clutch 28 of the transmission 2. The hydraulic control device 8 includes a plurality of solenoid valves for switching the oil passage and adjusting the hydraulic pressure. For example, as shown in FIG. 4, the hydraulic control device 8 includes a solenoid valve 42 for adjusting the hydraulic pressure of the oil chamber 41 for the friction coupling portion CB. The solenoid valve 42 is provided, for example, in each the friction coupling portion CB. The solenoid valve 42 is provided in an oil passage 43 communicating with the oil chamber 41. The solenoid valve 42 is, for example, a linear solenoid valve. The hydraulic control device 8 is communicably connected to the gear shift control device 7 and is controlled by the gear shift control device 7.

The accelerator opening degree sensor 11 detects an accelerator opening degree corresponding to an operation amount of an accelerator member (not shown) such as an accelerator pedal or an accelerator lever. The vehicle speed sensor 12 detects a vehicle speed of the vehicle 100. The shift position sensor 13 detects an operation position (parking, neutral, drive, upshift, downshift, and the like) of a shift lever (not shown). The engine rotation sensor 14 detects a rotation speed of the engine 1, that is, the rotation speed of the output shaft 1a. Hereinafter, the rotation speed of the engine 1 is also called an engine rotation speed. The input rotation sensor 15 detects the rotation speed of the input shaft 2a (the turbine runner 25 of the torque converter 20) of the transmission 2. Hereinafter, a rotation speed of the turbine runner 25 is also called a turbine rotation speed. The output rotation sensor 16 detects the rotation speed of the output shaft 2b of the transmission 2. These sensors (the accelerator opening degree sensor 11, the vehicle speed sensor 12, the shift position sensor 13, the engine rotation sensor 14, the input rotation sensor 15, and the output rotation sensor 16) are communicably connected to the gear shift control device 7.

The engine control device 6 and the gear shift control device 7 are each configured as an electric control unit (ECU), for example. The ECU includes, for example, a micro controller unit (MCU), a power supply circuit, a driver (controller), an input and output conversion circuit, and an input and output protection circuit and the like (all not shown). The ECU includes an electronic component (not shown) mounted on a circuit board. The circuit board is housed in a case (not shown). The MCU includes a central processing unit (CPU), a main storage device (memory), a rewritable nonvolatile storage device, an interface (input and output device), a communication device, a bus, and the like (all not shown). The main storage device includes, for example, a read only memory (ROM) and a random access memory (RAM). In an MCU of the engine control device 6, a CPU executes an arithmetic processing according to a program installed in a main storage device or the like, and controls each unit of the engine 1. In an MCU of the gear shift control device 7, a CPU executes an arithmetic processing according to a program installed in a main storage device or the like, and controls each unit of the hydraulic control device 8.

Figure 5:
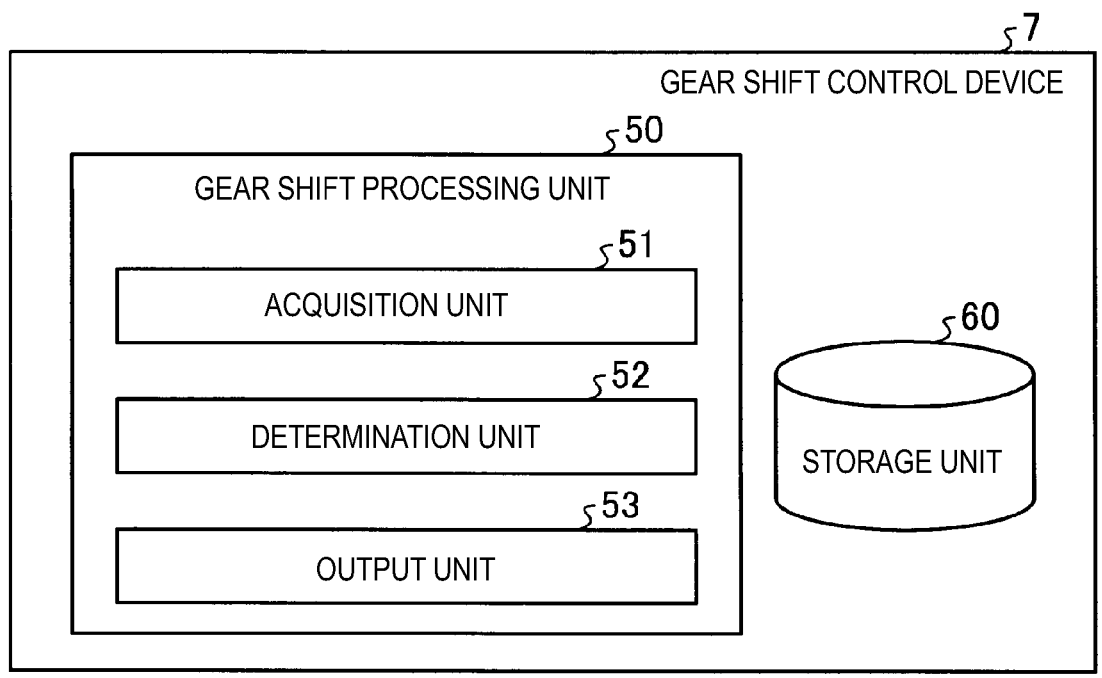
FIG. 5 is an exemplary block diagram of a configuration of a gear shift control device according to the embodiment.
Figure 6:
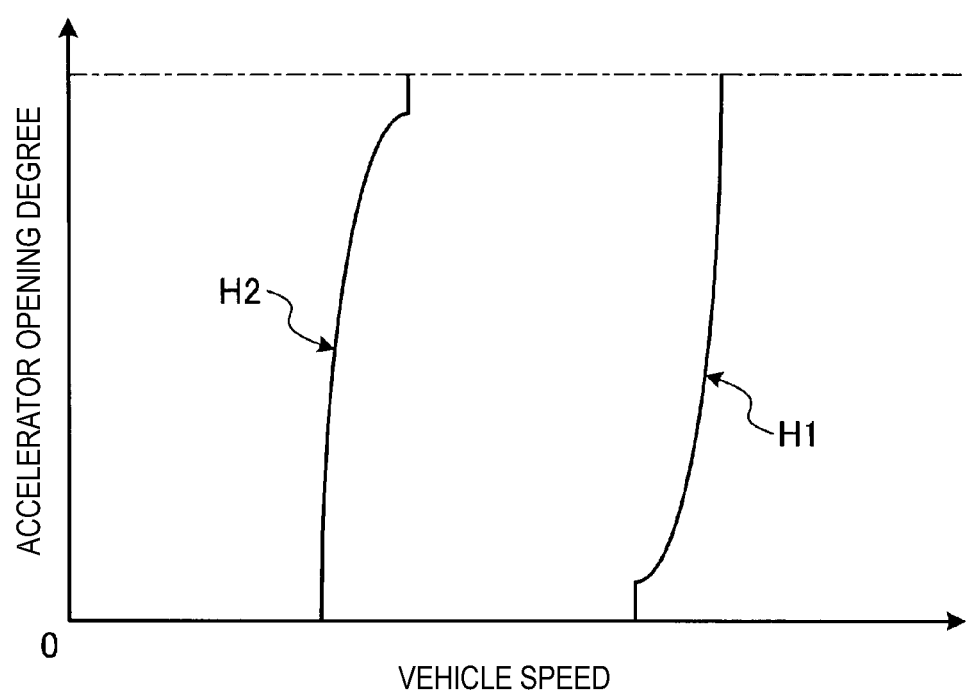
FIG. 6 is a diagram showing an example of a shift line in the gear shift control device according to the embodiment.

FIG. 5 is an exemplary block diagram of a configuration of the gear shift control device 7 according to the embodiment. FIG. 6 is a diagram showing an example of a shift line in the gear shift control device 7 according to the embodiment. As shown in FIG. 5, the gear shift control device 7 includes a gear shift processing unit 50 that executes a gear shift processing. The gear shift processing unit 50 includes an acquisition unit 51, a determination unit 52, and an output unit 53. The gear shift processing unit 50 (the acquisition unit 51, the determination unit 52, and the output unit 53) is implemented by the CPU of the gear shift control device 7 executing a program installed in the main storage device or the like. The gear shift processing unit 50 (the acquisition unit 51, the determination unit 52, and the output unit 53) may be configured by hardware. In addition, the gear shift control device 7 includes a storage unit 60 that stores various types of information to be referred to by the gear shift processing unit 50. The storage unit 60 is provided in the main storage device (memory) or the nonvolatile storage device. The storage unit 60 stores, for example, an upshift line H1 and a downshift line H2 shown in FIG. 6. Hereinafter, a shift line H may be used as a general term for the upshift line H1 and the downshift line H2.

The acquisition unit 51 acquires various types of information. For example, the acquisition unit 51 acquires the accelerator opening degree (hereinafter, also called an actual accelerator opening degree) detected by the accelerator opening degree sensor 11 from the accelerator opening degree sensor 11. The acquisition unit 51 acquires the vehicle speed (hereinafter, also called an actual vehicle speed) detected by the vehicle speed sensor 12 from the vehicle speed sensor 12. The acquisition unit 51 acquires the operation position of the shift lever (not shown) detected by the shift position sensor 13 from the shift position sensor 13. The acquisition unit 51 acquires the rotation speed of the engine 1 detected by the engine rotation sensor 14 from the engine rotation sensor 14. The acquisition unit 51 acquires the rotation speed of the input shaft $2a$ (the turbine runner 25 of the torque converter 20) of the transmission 2 detected by the input rotation sensor 15 from the input rotation sensor 15. The acquisition unit 51 acquires the rotation speed of the output shaft $2b$ of the transmission 2 detected by the output rotation sensor 16 from the output rotation sensor 16.

The determination unit 52 determines whether to shift gear based on the various types of information acquired by the acquisition unit 51. When a position of the shift lever (not shown) detected by the shift position sensor 13 is at a setting position in a manual transmission mode, that is, the transmission mode is set to the manual transmission mode, the determination unit 52 controls the transmission based on a signal from the shift position sensor 13.

When the position of the shift lever detected by the shift position sensor 13 is at the setting position in the automatic transmission mode, the determination unit 52 determines whether to shift gear based on the shift line H, the actual accelerator opening degree, the actual vehicle speed, and the like stored in the storage unit 60. For example, when the actual vehicle speed at a certain actual accelerator opening degree is equal to or higher than a vehicle speed corresponding to the actual accelerator opening degree of the upshift line H1, the gear shift processing unit 50 performs a gear shift processing of upshift. When the actual vehicle speed is equal to or lower than the vehicle speed corresponding to the actual accelerator opening degree of the downshift line H2, the gear shift processing unit 50 performs a gear shift processing of downshift. When the actual vehicle speed is a vehicle speed between the upshift line H1 and the downshift line H2, the gear shift processing unit 50 maintains a current shift stage.

When the determination unit 52 determines to shift gear, the output unit 53 outputs a command corresponding to the gear shift to the hydraulic control device 8. Specifically, the output unit 53 outputs, to the hydraulic control device 8, a target value of the hydraulic pressure to be applied on the friction coupling portion CB, that is, an instruction hydraulic pressure, which is a target value of the hydraulic pressure of the oil chamber 41.

Figure 7:
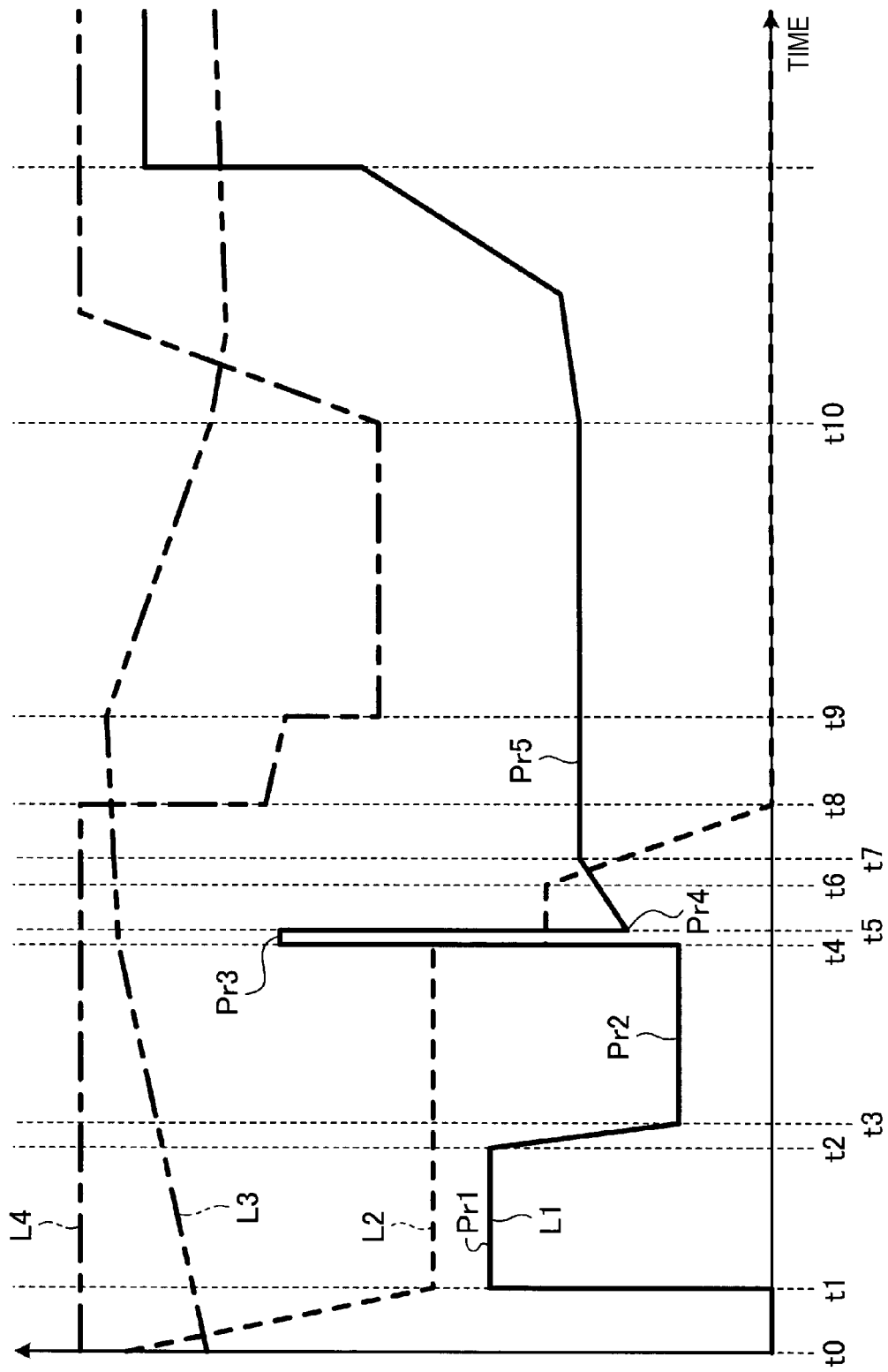
FIG. 7 is a timing chart of an example of a gear shift processing executed by a gear shift processing unit of the gear shift control device according to the embodiment.

FIG. 7 is a timing chart of an example of a gear shift processing executed by the gear shift processing unit 50 of the gear shift control device 7 according to the embodiment.

Next, the gear shift processing executed by the gear shift processing unit 50 of the gear shift control device 7 will be described with reference to FIG. 7. As an example, a gear shift processing when the shift stage is shifted from the first speed to the second speed (shifting up) will be described. In this case, the friction coupling portion B2 is the released-side friction coupling portion CB, and the friction coupling portion B1 is the coupled-side friction coupling portion CB.

The coupled-side friction coupling portion CB is an example of a first friction coupling portion. A line L1 in FIG. 7 indicates an instruction hydraulic pressure applied to the coupled-side friction coupling portion CB (hereinafter also called a coupled-side instruction hydraulic pressure). A line L2 in FIG. 7 indicates an instruction hydraulic pressure applied to the released-side friction coupling portion CB (hereinafter also called a released-side instruction hydraulic pressure). A line L3 in FIG. 7 indicates the rotation speed of the turbine runner 25. A line L4 in FIG. 7 indicates an engine torque instruction value. The engine torque instruction value is a target torque of the engine 1, and is, for example, target torque that is to be output to the engine control device 6 by the gear shift processing unit 50. A horizontal axis in FIG. 7 indicates elapsing of time. A vertical axis in FIG. 7 indicates magnitude of the released-side instruction hydraulic pressure, the coupled-side instruction hydraulic pressure, the rotation speed of the turbine runner 25, and the engine torque instruction value, and these values increase as going upward in FIG. 7. FIG. 7 shows an example in which the determination unit 52 determines that the gear shift from the first speed to the second speed is performed at a time point t0.

When the determination unit 52 determines the gear shift from the first speed to the second speed is performed (at the time point t0), the output unit 53 starts the control. Specifically, the determination unit 52 gradually decreases the released-side instruction hydraulic pressure (from the time point t0 to a time point t8). The output unit 53 gradually decreases the released-side instruction hydraulic pressure from the time point t0 to a time point t1, maintains the hydraulic pressure constant from the time point t1 to a time point t4, decreases the hydraulic pressure at the time point t4, maintains the hydraulic pressure constant from the time point t4 to a time point t6, and gradually decreases the hydraulic pressure from the time point t6 to a time point t8.

On the other hand, the output unit 53 starts precharge control over the coupled-side friction coupling portion CB from the time point t1. Specifically, the output unit 53 increases a coupled-side instruction hydraulic pressure Pr to a coupled-side instruction hydraulic pressure Pr1, and maintains the coupled-side instruction hydraulic pressure Pr1 up to a time point t2. Accordingly, as shown in FIG. 3, the piston 33 moves from a position l1 in a direction toward the friction plate group 35 (rightward in FIG. 3). The coupled-side instruction hydraulic pressure Pr1 is an example of a first value.

The description returns to FIG. 7. Next, the output unit 53 performs standby pressure control over the coupled-side friction coupling portion CB. Specifically, the output unit 53 gradually decreases the coupled-side instruction hydraulic pressure Pr from the coupled-side instruction hydraulic pressure Pr1 to a coupled-side instruction hydraulic pressure Pr2 that is smaller than the coupled-side instruction hydraulic pressure Pr1 from the time point t2 to a time point t3, and then maintains the coupled-side instruction hydraulic pressure Pr2 up to the time point t4 (standby pressure control). The coupled-side instruction hydraulic pressure Pr2 is a hydraulic pressure at which the piston 33 does not move toward the friction plate group 35 side (rightward in FIG. 3) beyond a position l2 even after elapsing of time. That is, the coupled-side instruction hydraulic pressure Pr2 is a hydraulic pressure at which a decoupled state of the coupled-side friction coupling portion CB is maintained. The coupled-side instruction hydraulic pressure Pr2 is also called a standby pressure. Accordingly, as shown in FIG. 3, from the time point t2 to the time point t3, the piston 33 stops at the position 12, and the position 12 is a position where the piston 33 and the friction plate group 35 are separated from each other.

Next, the output unit 53 performs pin charge control over the coupled-side friction coupling portion CB (from the time point t4 to a time point t5). Specifically, the output unit 53 increases the coupled-side instruction hydraulic pressure Pr to a coupled-side instruction hydraulic pressure Pr3, and maintains the coupled-side instruction hydraulic pressure Pr3 up to the time point t5. That is, the output unit 53 temporarily increases the coupled-side instruction hydraulic pressure Pr. The coupled-side instruction hydraulic pressure Pr3 is, for example, larger than the coupled-side instruction hydraulic pressure Pr1. A start timing of the pin charge control (the time point t4) is after a predetermined time from the time point t3. The coupled-side instruction hydraulic pressure Pr3 may be equal to or less than the coupled-side instruction hydraulic pressure Pr1. A time (period) from the time point t4 to the time point t5 is shorter than a time (period) from the time point t1 to the time point t2.

Next, the output unit 53 gradually increases the coupled-side instruction hydraulic pressure Pr from a coupled-side instruction hydraulic pressure Pr4 to a coupled-side instruction hydraulic pressure Pr5 from the time point t5 to a time point t7. The coupled-side instruction hydraulic pressure Pr4 is, for example, a value that does not generate frictional force of the friction coupling portion CB. The coupled-side instruction hydraulic pressure Pr4 is not limited to the above. The coupled-side instruction hydraulic pressure Pr4 is, for example, a value that does not generate the frictional force of the friction coupling portion CB for a predetermined period. In this case, the frictional force of the friction coupling portion CB can be generated after a predetermined period. That is, the coupled-side instruction hydraulic pressure Pr4 is, for example, a value that does not generate the frictional force of the friction coupling portion CB for at least a predetermined period. The predetermined period may be set as appropriate. In addition, the coupled-side instruction hydraulic pressure Pr5 is, for example, a hydraulic pressure at which an inertia phase can be started. That is, the coupled-side instruction hydraulic pressure Pr5 is a hydraulic pressure that is equal to or larger than the coupled-side instruction hydraulic pressure Pr4 and generates the frictional force of the friction coupling portion CB. The output unit 53 maintains the coupled-side instruction hydraulic pressure Pr5 from the time point t7 to a time point t10. The piston 33 resumes moving in the direction toward the friction plate group 35 from the time point t4 and a time point t9. Then, the piston 33 contacts the friction plate group 35 and presses the friction plate group 35. Accordingly, the frictional force is generated between the inner side friction plate 31 and the outer side friction plate 32. Here, a position where the piston 33 contacts the friction plate group 35 is also called a piston touch position. When the piston 33 moves further from the piston touch position toward the friction plate group 35, pressing force applying on the friction plate group 35 increases. Then, a time point when the piston 33 is completely moved to the friction plate group 35 side, that is, the time point when the piston 33 cannot move toward the friction plate group 35 side is a start time point (restart time point) of a servo 36. At this time, all hydraulic pressure in the oil chamber 41 is used to fasten the inner side friction plate 31 and the outer side friction plate 32. A time point t9 between the time point t7 to the time point t10 is a time point when the gear shift processing unit 50 detects the start of the inertia phase. That is, in this example, a torque phase is before the time point t9. Next, the output unit 53 gradually increases the coupled-side instruction hydraulic pressure Pr after the time point t10. Here, the engine torque instruction value (line L4 in FIG. 7) is decreased to a predetermined torque from a time point t8 to the time point t9 at which pressure reduction of the released-side instruction hydraulic pressure is completed. Accordingly, the start of the inertia phase can be promoted. Further, at the time point t9 when the gear shift processing unit 50 detects the start of the inertia phase, the engine torque instruction value (line L4 in FIG. 7) is further decreased. Accordingly, a progress of the inertia phase can be promoted.

By the above control, the states of the released-side friction coupling portion CB and the coupled-side friction coupling portion CB transition from the torque phase to the inertia phase, and the gear shift is completed.

Figure 8:
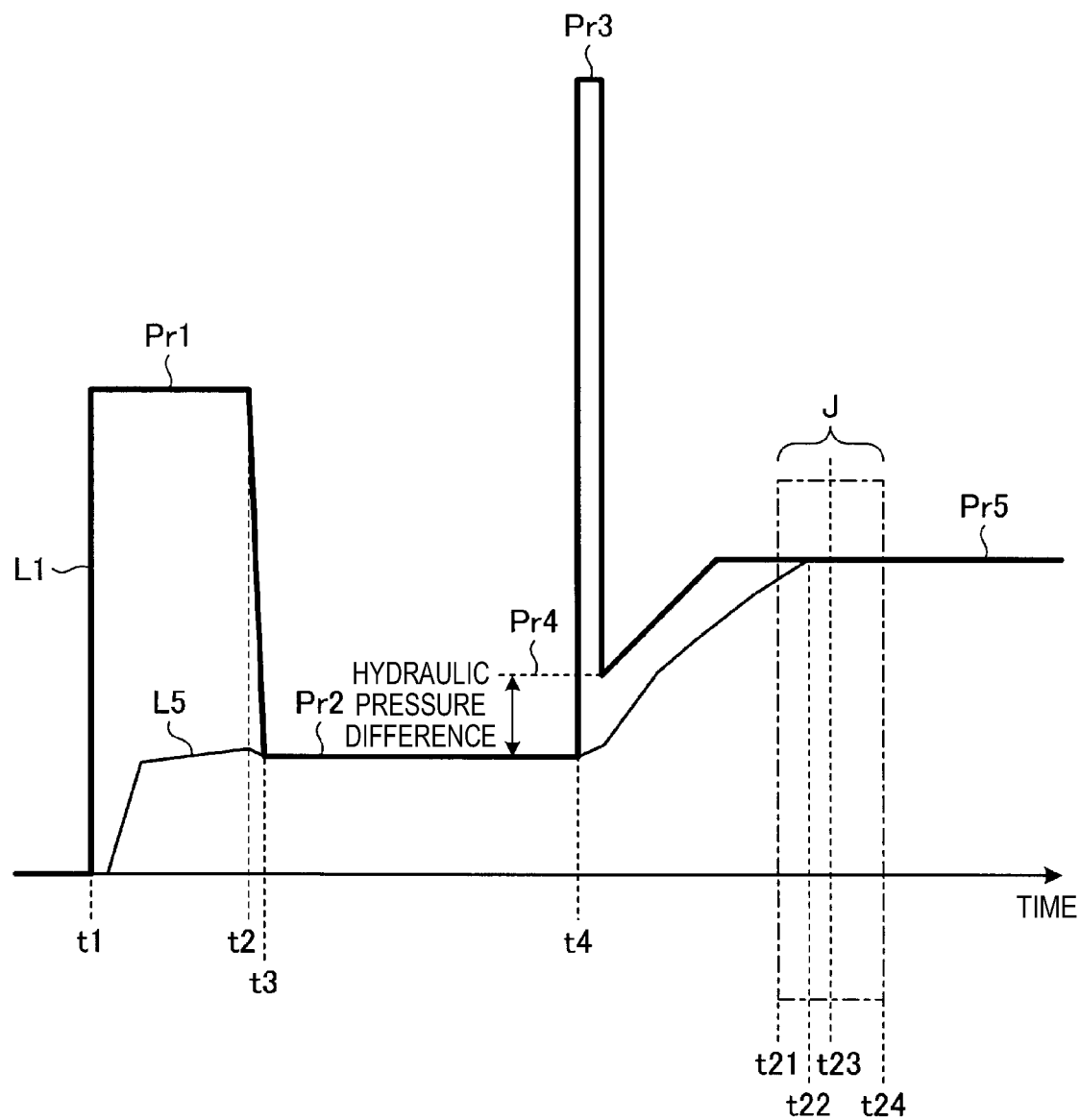
FIG. 8 is a timing chart showing an example of an instruction hydraulic pressure and an actual hydraulic pressure in the gear shift processing executed by the gear shift processing unit of the gear shift control device according to the embodiment.

FIG. 8 is a timing chart showing an example of an instruction hydraulic pressure (the coupled-side instruction hydraulic pressure) and an actual hydraulic pressure in the gear shift processing executed by the gear shift processing unit 50 of the gear shift control device 7 according to the embodiment. A line L1 in FIG. 8 indicates, similarly to FIG. 7, the coupled-side instruction hydraulic pressure, and a line L5 in FIG. 8 indicates the hydraulic pressure of the oil chamber 41 applying on the coupled-side friction coupling portion CB (hereinafter, also called an actual hydraulic pressure). A time point t23 in FIG. 8 is a start target time point of the servo 36, that is, a target time point when the piston 33 starts moving, and a time point t22 in FIG. 8 is a time point when the servo 36 actually starts, that is, the time point when the piston 33 actually starts moving. In the embodiment, in order to ensure a start performance of the servo 36 with respect to a start hydraulic pressure of the inertia phase, the coupled-side instruction hydraulic pressure Pr4 (hereinafter, also called a pin charge lower pressure) is set such that the servo 36 actually starts within a range J during a predetermined time point t21 to a time point t24, without relying on the coupled-side instruction hydraulic pressure Pr2 (standby pressure).

Figure 9:
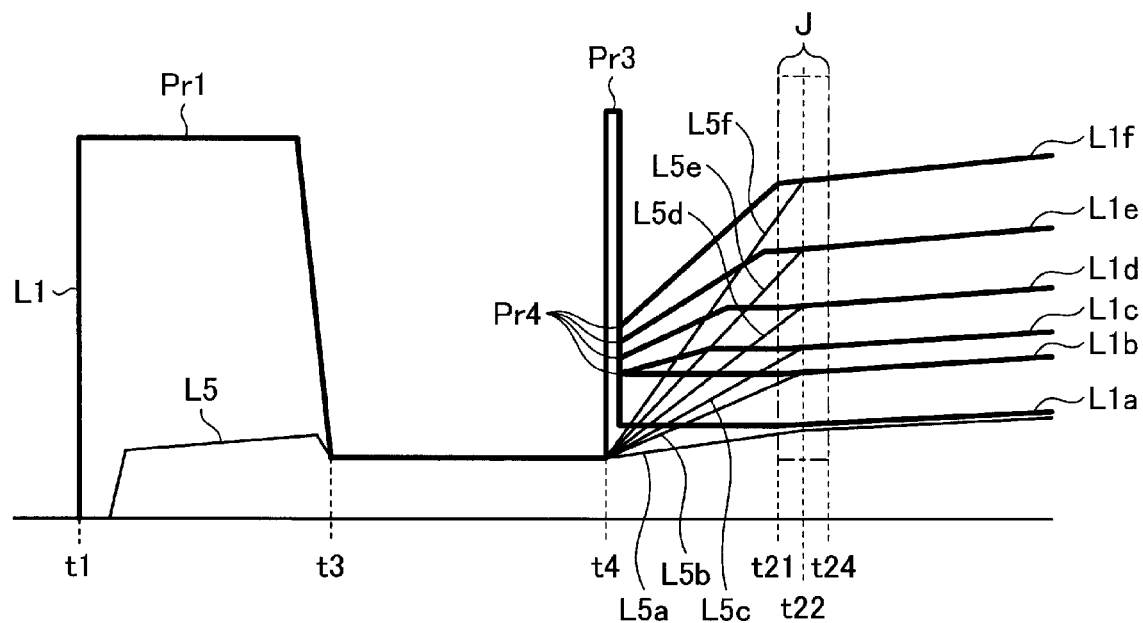
FIG. 9 is a timing chart showing an example of an instruction hydraulic pressure and an actual hydraulic pressure corresponding to input torque in the gear shift processing executed by the gear shift processing unit of the gear shift control device according to the embodiment.

FIG. 9 is a timing chart showing an example of an instruction hydraulic pressure and an actual hydraulic pressure according to input torque in the gear shift processing executed by the gear shift processing unit 50 of the gear shift control device 7 according to the embodiment. Lines L1a to L1f in FIG. 9 indicate the coupled-side instruction hydraulic pressure corresponding to the input torque from the engine 1 to the transmission 2, and the input torque from the engine 1 decreases in an order from the lines L1a to L1f. Lines L5a to L5f in FIG. 9 indicate the actual hydraulic pressure corresponding to the coupled-side instruction hydraulic pressure indicated by the lines L1a to L1f. As shown in FIG. 9, in the embodiment, the output unit 53 sets the coupled-side instruction hydraulic pressure Pr4 (pin charge lower pressure) according to the input torque from the engine 1 to the transmission 2. Specifically, the output unit 53 sets the coupled-side instruction hydraulic pressure Pr4 (pin charge lower pressure) such that the coupled-side instruction hydraulic pressure Pr4 increases as the input torque from the engine 1 to the transmission 2 increases. The setting of the coupled-side instruction hydraulic pressure Pr4 corresponding to the input torque from the engine 1 to the transmission 2 by the output unit 53 is not limited to the above. Here, for example, the coupled-side instruction hydraulic pressure Pr4 can be set to a value that does not generate the frictional force of the friction coupling portion CB in the case of the lines L1b to L1f, and can be set to a value that does not generate the frictional force of the friction coupling portion CB for a predetermined period in the case of the line L1a, that is, when the coupled-side instruction hydraulic pressure Pr4 and the coupled-side instruction hydraulic pressure Pr5 are the same.

Figure 10:
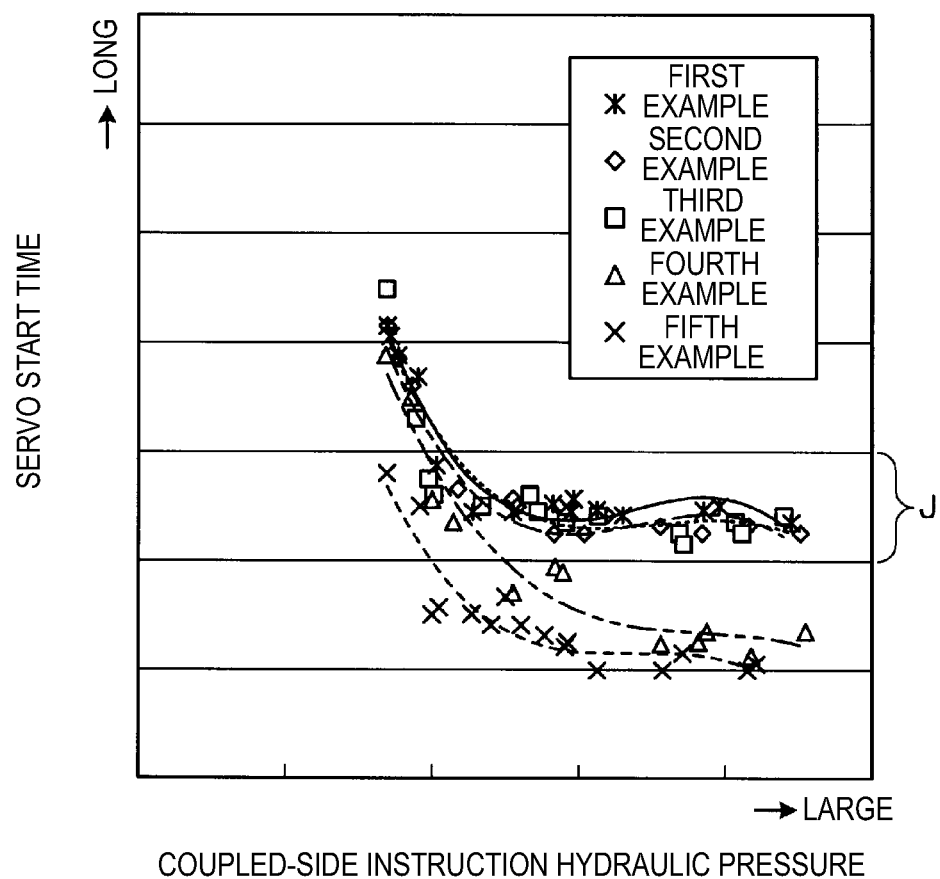
FIG. 10 is a diagram showing a relationship between a coupled-side instruction hydraulic pressure and a servo start time after pin charge control.

FIG. 10 is a diagram showing a relationship between a coupled-side instruction hydraulic pressure and a servo start time in the embodiment. The horizontal axis of FIG. 10 is the coupled-side instruction hydraulic pressure Pr5, and the vertical axis of FIG. 10 is the start time of the servo 36. FIG. 9 shows the relationship between the coupled-side instruction hydraulic pressure and the servo start time after the pin charge control of the first to fifth examples. In the first to fifth examples, a magnification of the coupled-side instruction hydraulic pressure Pr4 (pin charge lower pressure) to the coupled-side instruction hydraulic pressure Pr2 (standby pressure) is 1.2 times, 1.4 times, 1.6 times, and 2.0 times. The range J of the servo start time in FIG. 9 is a range of a target servo start time. As can be seen from FIG. 9, by setting (changing) the magnification of the coupled-side instruction hydraulic pressure Pr4 (pin charge lower pressure) to the coupled-side instruction hydraulic pressure Pr2 (standby pressure) according to a magnitude of the coupled-side instruction hydraulic pressure Pr5, the servo start time can be within the range of the target servo start time according to the magnitude of the coupled-side instruction hydraulic pressure Pr5.

In the processing of FIG. 7, control over the coupled-side instruction hydraulic pressure includes the precharge control, the standby pressure control, torque phase control, inertia phase control, completion control, and the like, and control over the released-side instruction hydraulic pressure includes gear shift initial stage standby control, release control, release standby control, and the like. The control will be described in detail in the example of FIG. 11.

As an example, the processing of FIG. 7 described above is executed only when the actual accelerator opening degree is less than a prescribed threshold value. The threshold value is, for example, 80%, but may be a value other than 80%.

Next, the gear shift processing executed by the gear shift processing unit 50 of the gear shift control device 7 when the actual accelerator opening degree is equal to or higher than the prescribed threshold value will be described with reference to FIG. 11. As an example, similarly to the case of FIG. 7, the gear shift processing when the shift stage is shifted from the first speed to the second speed (shifting up) will be described. The processing of FIG. 11 differs from the processing of FIG. 7 in that a gear shift progress determination is performed.

Figure 11:
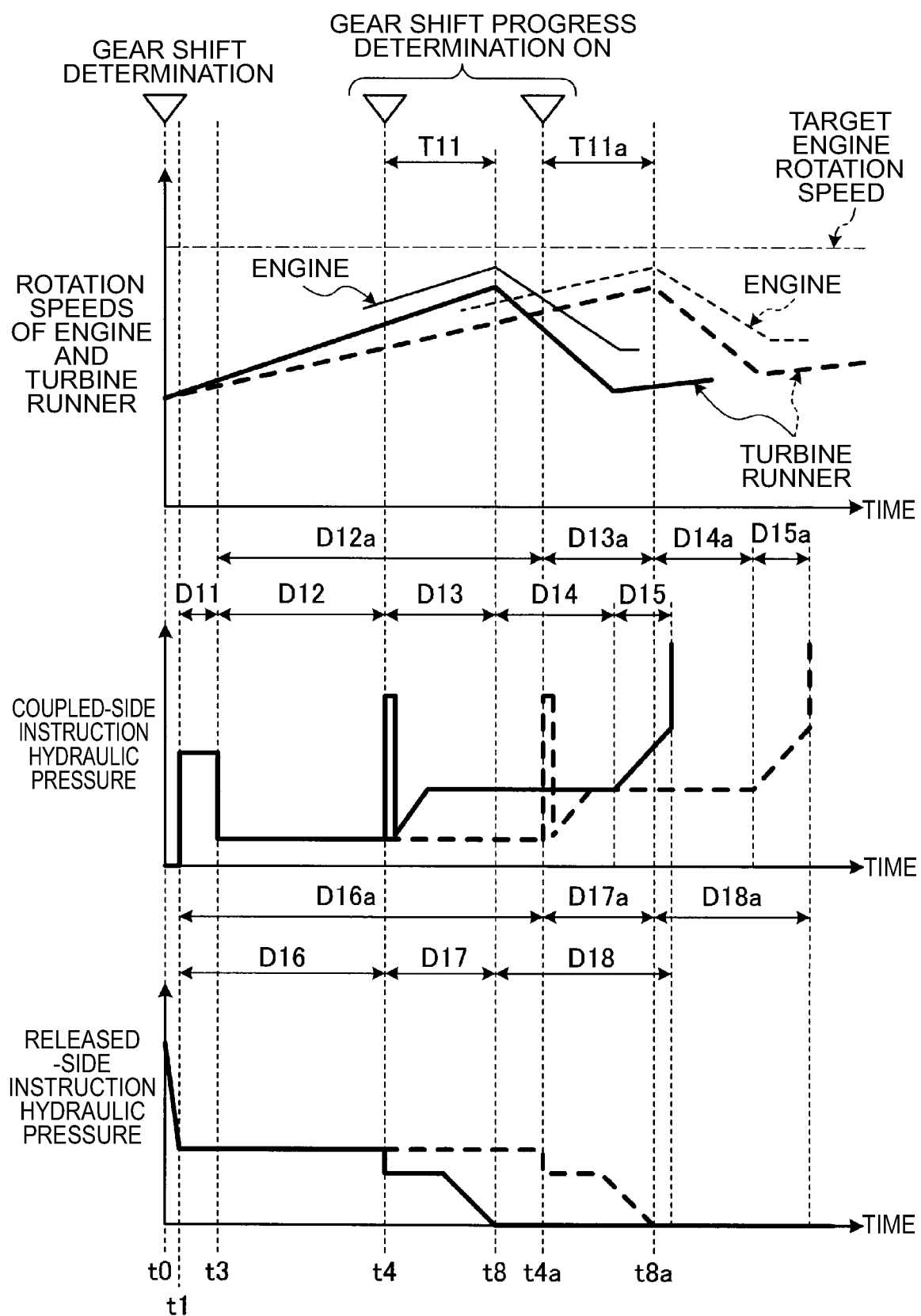
FIG. 11 is a timing chart showing an example of an instruction hydraulic pressure and rotation speeds of an engine and a turbine runner in the gear shift processing executed by the gear shift processing unit of the gear shift control device according to the embodiment.

FIG. 11 is a timing chart showing an example of an instruction hydraulic pressure and rotation speeds of the engine and the turbine runner in the gear shift processing executed by the gear shift processing unit 50 of the gear shift control device 7 according to the embodiment.

FIG. 11 shows the released-side instruction hydraulic pressure, the coupled-side instruction hydraulic pressure, and the rotation speeds of the engine 1 and the turbine runner 25 in two states where total weights of the vehicle 100 are different. The solid line in FIG. 11 is the case where the total weight of the vehicle 100 is a first weight, and the dotted line in FIG. 11 is the case where the total weight of the vehicle is a second weight that is heavier than the first weight. For example, when the vehicle 100 is a truck, the first weight is a state in which a load is not loaded on a loading platform, and the second weight is a state in which the load is loaded on the loading platform. Hereinafter, the case where the total weight of the vehicle is the first weight is also referred to as that the vehicle 100 is not loaded, and the case where the total weight of the vehicle 100 is the second weight is referred to as that the vehicle 100 is loaded. The time points in FIG. 11 are similar as the time points shown in FIG. 7. However, the time point t4 and the time point t8 are time points when the vehicle 100 is not loaded, and a time point t4a and a time point t8a are time points when the vehicle 100 is loaded and correspond to the time point t4 and the time point t8.

In the control over the coupled-side instruction hydraulic pressure, the gear shift processing unit 50 performs the precharge control during a period D11, performs the standby pressure control during periods D12 and D12a, performs the torque phase control during periods D13 and D13a, performs the inertia phase control during periods D14 and D14a, and performs the completion control during periods D15 and D15a. The precharge control is a control phase for filling the oil chamber 41 (clutch pack) with oil. The standby pressure control is a control phase for starting the movement (stroke) of the piston 33 of the coupled-side friction coupling portion CB and keeping the piston 33 at a prescribed position. The prescribed position is a position where the piston 33 is not in contact with the friction plate group 35 and faces the friction plate group 35 with a relatively small gap. The torque phase control is a control phase for shifting torque sharing between the released-side friction coupling portion CB and the coupled-side friction coupling portion CB. In other words, the torque phase control is control that promotes a shift to a target shift stage while giving a torque capacity to the coupled-side friction coupling portion CB. This torque phase control includes the pin charge control. The inertia phase control is a control phase for shifting the gear ratio under control when the turbine rotation speed is changed. The completion control is control for completing the gear shift control, and is control until an inertia change is completed and the friction coupling portion CB reaches a steady state.

In the control over the released-side instruction hydraulic pressure, the gear shift processing unit 50 performs the gear shift initial stage standby control during periods D16 and D16a, performs the release control during periods D17 and D17a, and performs the release standby control during periods D18 and D18a. The gear shift initial stage standby control is a control phase for maintaining a minimum hydraulic pressure at which slip (sliding of the inner side friction plate 31 and the outer side friction plate 32) is not generated in the released-side friction coupling portion CB. The release control is a control phase for decreasing the hydraulic pressure of the released-side friction coupling portion CB (drain oil) as the coupled-side friction coupling portion CB has a torque capacity in order to shift the released-side friction coupling portion CB and the coupled-side friction coupling portion CB. The release standby control is a control phase for waiting for the coupled-side friction coupling portion CB to be completely fastened (coupled state) after the released-side friction coupling portion CB is completely released (decoupled state).

A time T11 and a time T11a in FIG. 11 are estimated times from when the gear shift progress determination to be described later is ON to when the inertia phase starts.

When it is determined to shift gear based on the shift line H, the gear shift processing unit 50 starts the gear shift control regardless of an acceleration of the vehicle 100 (t0). That is, the gear shift processing unit 50 executes the precharge control and the standby pressure control. Next, the gear shift processing unit 50 performs a gear shift progress determination. The gear shift progress determination is a determination as to whether to proceed from the standby pressure control to a subsequent processing. This determination is made based on the inertia phase start time, a change rate of turbine rotation, and a slip amount. The inertia phase start time is a time from a torque phase control start time point (time point t4) to an estimated inertia phase change start time point (time point t8). A change rate of the turbine rotation speed is a change rate of the rotation speed of the turbine runner 25, and the slip amount is a difference between the rotation of the engine 1 and the rotation of the turbine runner 25. The determination to proceed from the standby pressure control to the subsequent processing is referred to as "ON", and the determination not to proceed from the standby pressure control to the subsequent processing, that is, the determination to continue the standby pressure control, is referred to as "OFF". The gear shift processing unit 50 executes the standby pressure control before the gear shift progress determination is ON in an execution state of the standby pressure control. In this state, the shift stage is maintained at the first speed. Then, the gear shift processing unit 50 executes the control subsequent to the torque phase control when the gear shift progress determination is ON. Accordingly, the gear shift is performed in which the inertia phase is started at a target engine rotation speed that is a target rotation speed of the engine 1.

As can be seen from above, in the example of FIG. 11, the start timing of the pin charge control (t4) is not set in advance, and the determination unit 52 determines the start timing of the pin charge control (torque phase control) in a period (hereinafter, also called a standby pressure period) after the time point t3 during which the coupled-side instruction hydraulic pressure Pr is set to the coupled-side instruction hydraulic pressure Pr2 (standby pressure).

Next, details of the processing executed by the gear shift processing unit 50 of the gear shift control device 7 in the example of FIG. 11 will be described in detail with reference to FIGS. 12 to 16.

Figure 12:
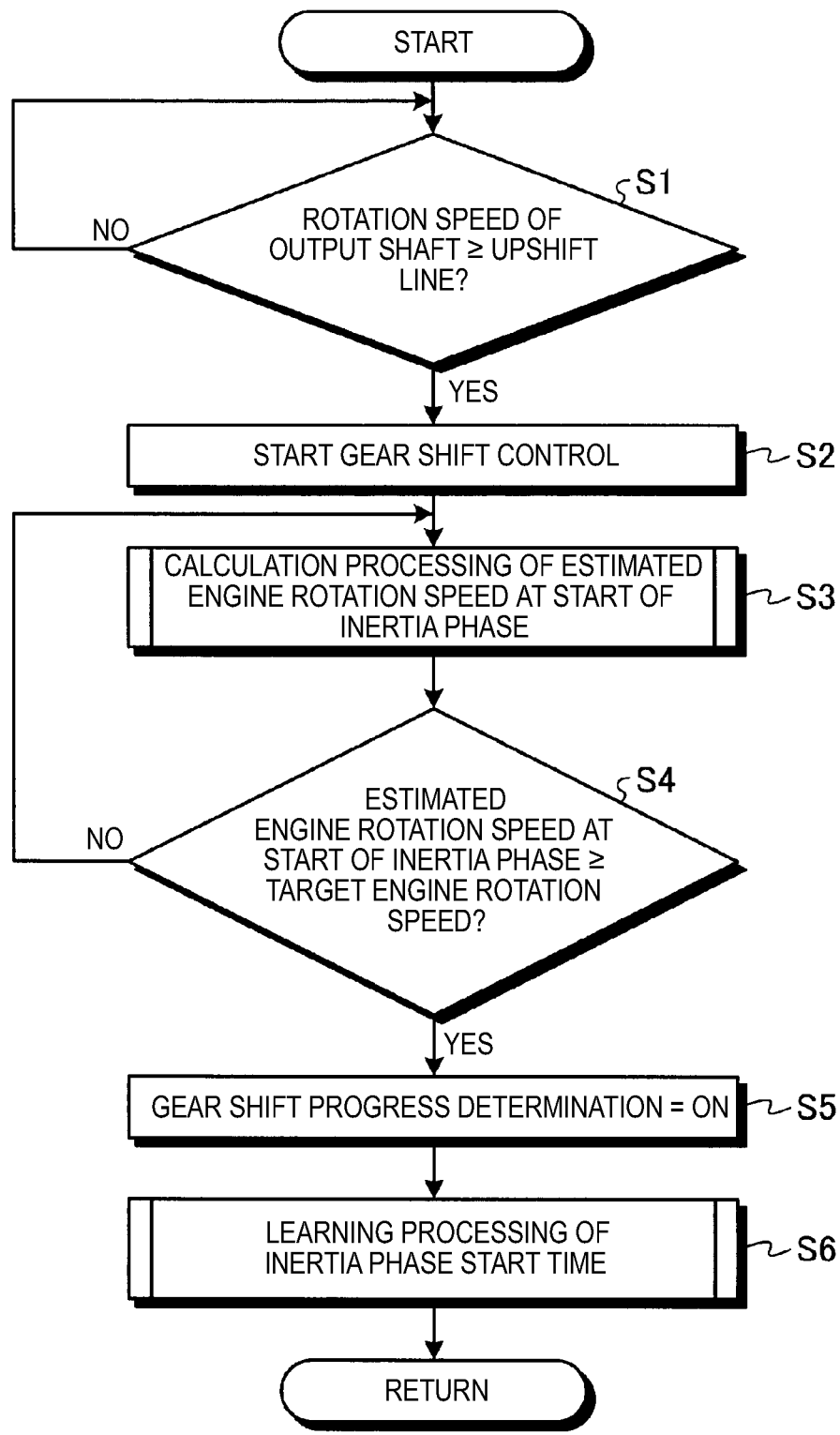
FIG. 12 is a flowchart showing an example of a part of the gear shift processing executed by the gear shift processing unit of the gear shift control device according to the embodiment.

FIG. 12 is a flowchart showing an example of a part of the gear shift processing (gear shift progress determination) executed by the gear shift processing unit 50 of the gear shift control device 7 according to the embodiment. As shown in FIG. 12, the determination unit 52 of the gear shift processing unit 50 in the gear shift control device 7 determines whether the rotation speed of the output shaft 2b exceeds the upshift line H1 (S1). When the rotation speed of the output shaft 2b does not exceed the upshift line H1 (S1: No), the determination unit 52 repeats the processing of S1. When the determination unit 52 determines the rotation speed of the output shaft 2b exceeds the upshift line H1 (S1: Yes), that is, when the determination unit 52 determines to shift gear, the gear shift processing unit 50 starts the gear shift control (S2).

When the gear shift control is started, the gear shift processing unit 50 performs a calculation processing of the estimated engine rotation speed at the start of the inertia phase (S3).

Figure 13:
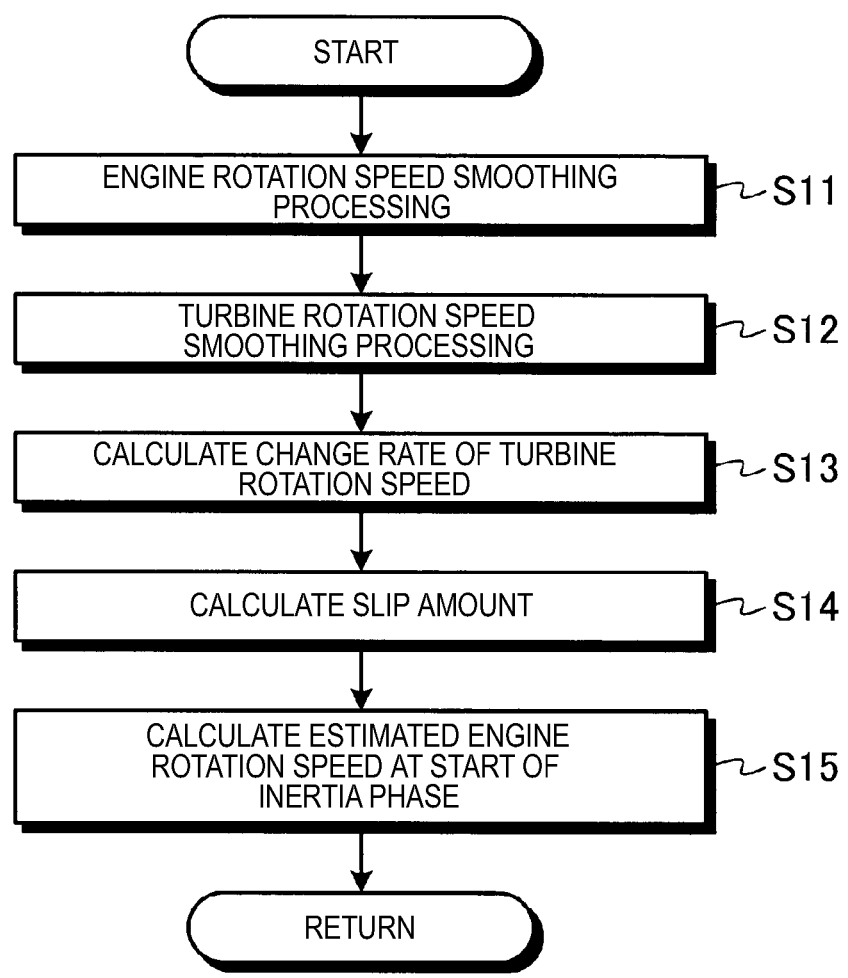
FIG. 13 is a flowchart showing a calculation processing of an estimated engine rotation speed at a start of an inertia phase, and the calculation processing is executed by the gear shift processing unit of the gear shift control device according to the embodiment.

The calculation processing of the estimated engine rotation speed at the start of the inertia phase will be described with reference to FIG. 13. FIG. 13 is a flowchart showing the calculation processing of the estimated engine rotation speed at the start of the inertia phase and the calculation processing is executed by the gear shift processing unit 50 of the gear shift control device 7 according to the embodiment. As shown in FIG. 13, the gear shift processing unit 50 performs an engine rotation speed smoothing processing of smoothing the engine rotation speed (S11). Next, the gear shift processing unit 50 performs a turbine rotation speed smoothing processing of smoothing the turbine rotation speed (S12). In S11 and S12, a low-pass filter processing may be performed instead of the smoothing processing.

Next, the gear shift processing unit 50 calculates a change rate of the turbine rotation speed (change rate of the turbine rotation speed) from the turbine rotation speed smoothed in S12 (S13). Next, the gear shift processing unit 50 calculates the slip amount from the engine rotation speed smoothed in S11 and the turbine rotation speed smoothed in S12 (S14). The slip amount is the difference between the rotation of the engine 1 and the rotation of the turbine runner 25. Next, the gear shift processing unit calculates the estimated engine rotation speed at the start of the inertia phase (S15). Specifically, the gear shift processing unit calculates the estimated engine rotation speed at the start of the inertia phase according to the following equation (1).

Estimated engine rotation speed at start of inertia phase=(turbine rotation speed after smoothing)+ (change rate of turbine rotation speed)×(inertia phase start time)+(slip amount)    (1)

The description returns to FIG. 12. When the calculation processing of the estimated engine rotation speed at the start of the inertia phase is performed (S3), the gear shift processing unit 50 determines whether the calculated estimated engine rotation speed at the start of the inertia phase exceeds the target engine rotation speed (S4). When the gear shift processing unit 50 determines that the estimated engine rotation speed at the start of the inertia phase does not exceed the target engine rotation speed (S4: No), the processing returns to S3, and the processing of S3 is performed again. On the other hand, when the gear shift processing unit 50 determines that the estimated engine rotation speed at the start of the inertia phase exceeds the target engine rotation speed (S4: Yes), the gear shift progress determination is ON (S5).

Next, the gear shift processing unit 50 performs a learning processing of the inertia phase start time (S6).

Figure 14:
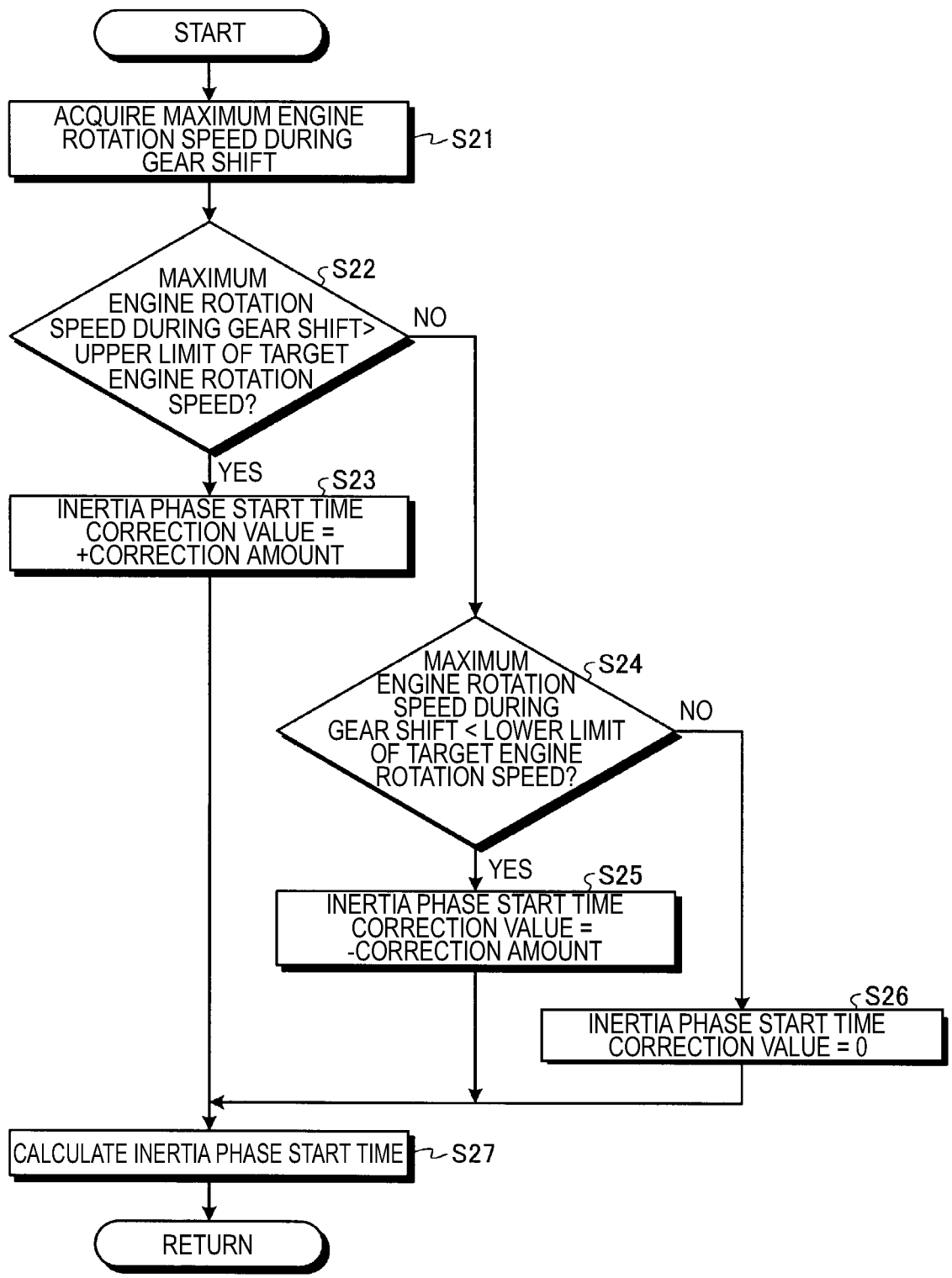
FIG. 14 is a flowchart showing a learning processing of an inertia phase start time executed by the gear shift processing unit of the gear shift control device according to the embodiment.

The learning of the inertia phase start time will be described with reference to FIG. 14. FIG. 14 is a flowchart showing the learning processing of the inertia phase start time executed by the gear shift processing unit 50 of the gear shift control device 7 according to the embodiment. As shown in FIG. 14, the gear shift processing unit 50 of the gear shift control device 7 acquires a maximum engine rotation speed during the gear shift, which is a maximum rotation speed of the engine 1 during the execution of the gear shift control (S21). Specifically, the gear shift processing unit 50 stores engine rotation speeds every prescribed time during the execution of the gear shift control in an engine rotation speed storage area provided in the storage unit 60. Then, a maximum engine rotation speed among a plurality of engine rotation speeds stored in the engine rotation speed storage area is acquired as the maximum engine rotation speed during the gear shift. The gear shift processing unit 50 erases the engine rotation speed in previous gear shift control that is already stored in the engine rotation speed storage area at a start of current gear shift control. A method of acquiring the maximum engine rotation speed during the gear shift in S21 is not limited to the above. For example, a maximum engine rotation speed may be stored by storing the engine rotation speed for every prescribed time during the execution of the gear shift control, comparing the engine rotation speed with a previous engine rotation speed, and updating the engine rotation speed when the engine rotation speed is larger than the previous engine rotation speed, and thus the engine rotation speed may be acquired as the maximum engine rotation speed during the gear shift.

Next, the gear shift processing unit 50 determines whether the maximum engine rotation speed during the gear shift exceeds an upper limit of the target engine rotation speed (S22). When it is determined that the maximum engine rotation speed during the gear shift exceeds the upper limit of the target engine rotation speed (S22: Yes), the gear shift processing unit 50 determines that the setting of the inertia phase start time is short, and sets an inertia phase start time correction value, which is a correction value of the inertia phase start time, to a positive correction amount "+correction amount".

On the other hand, when it is determined that the maximum engine rotation speed during the gear shift does not exceed the upper limit of the target engine rotation speed (S22: No), the gear shift processing unit 50 determines whether the maximum engine rotation speed during the gear shift falls below a lower limit of the target engine rotation speed (S24). When it is determined that the maximum engine rotation speed during the gear shift falls below the lower limit of the target engine rotation speed (S24: Yes), the gear shift processing unit 50 determines that the setting of the inertia phase start time is long, and sets the inertia phase start time correction value to a negative correction amount "-correction amount".

When it is determined that the maximum engine rotation speed during the gear shift does not exceed the upper limit of the target engine rotation speed (S22: No) and the maximum engine rotation speed during the gear shift does not fall below the lower limit of the target engine rotation speed (S24: No), that is, when the maximum engine rotation speed during the gear shift is within a range between the upper limit and the lower limit of the target engine rotation speed, the gear shift processing unit 50 determines that the setting of the inertia phase start time is correct, and sets the inertia phase start time correction value to "0" (S26).

Next, the gear shift processing unit 50 adds the inertia phase start time correction value to the inertia phase start time before correction, and calculates a new inertia phase start time (S27). The gear shift processing unit 50 stores the calculated inertia phase start time in the storage unit 60. Thus, the gear shift processing unit 50 learns the inertia phase start time.

As described above, the gear shift processing unit 50 uses a time from the torque phase control start time point (time point t4) to the estimated inertia phase change start time point (time point t8) as the inertia phase start time, and uses the time to estimate the engine rotation speed at the start of the inertia phase. The inertia phase start time is learned and corrected for every gear shift control such that the engine rotation speed at the inertia phase start time (maximum engine rotation speed during the gear shift) falls within the range between the upper limit and the lower limit of the target engine rotation speed. Thus, the reason for performing the correction based on the learning of the inertia phase start time is that there is a possibility that a disclosed timing of the gear shift may be different due to individual differences or aging of the transmission 2.

Figure 15:
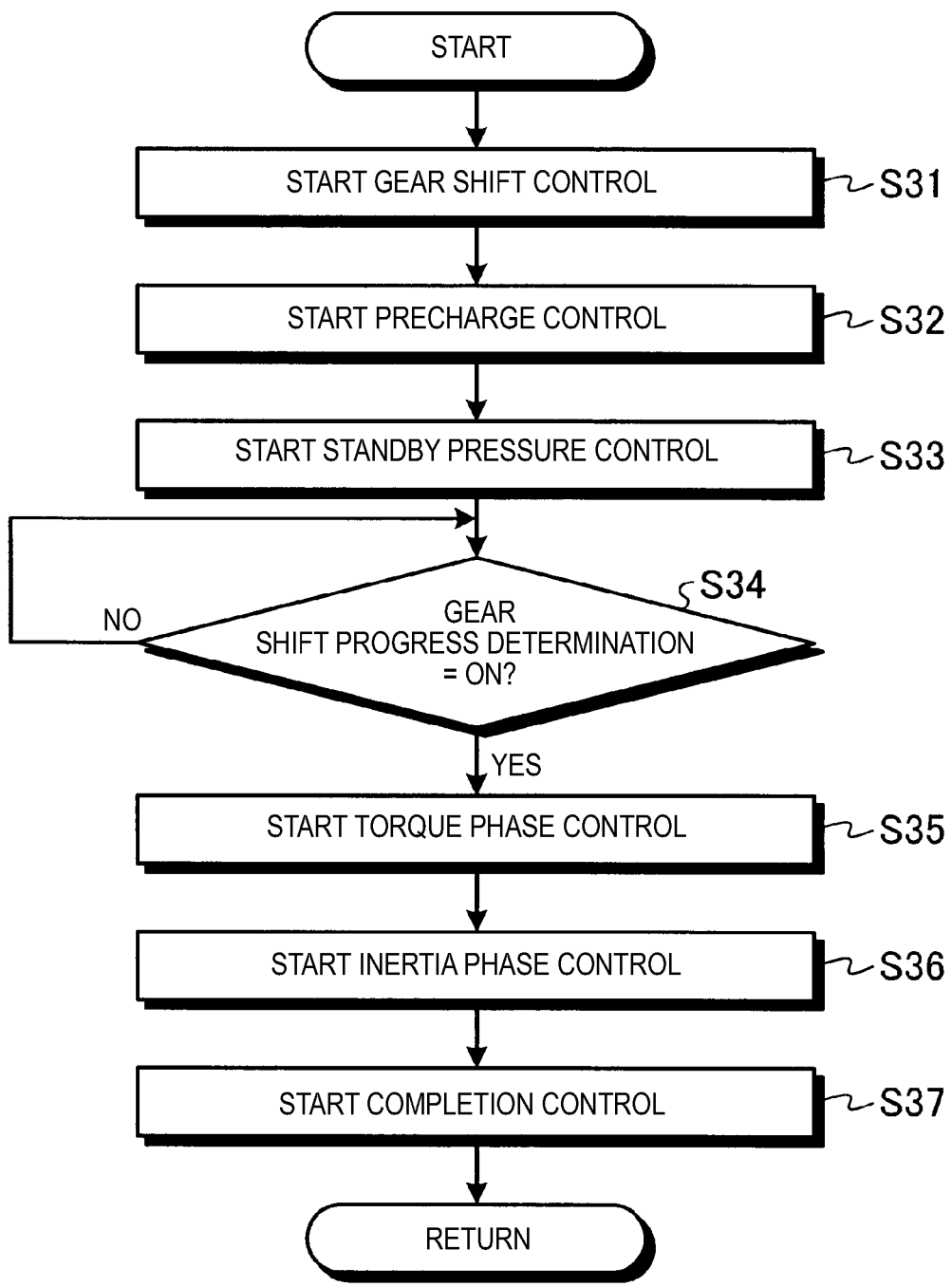
FIG. 15 is a flowchart showing a hydraulic control processing of a friction coupling portion on a coupled side executed by the gear shift processing unit of the gear shift control device according to the embodiment.

FIG. 15 is a flowchart showing a hydraulic control processing of the coupled-side friction coupling portion executed by the gear shift processing unit 50 of the gear shift control device 7 according to the embodiment.

As shown in FIG. 15, when gear shift control on the coupled side is started (S31), the gear shift processing unit 50 starts the precharge control (S32).

When the precharge control is ended, the gear shift processing unit 50 starts the standby pressure control (S33). When the gear shift progress determination is not "ON", that is, when the gear shift progress determination is "OFF" (S34: No), the gear shift processing unit 50 continues the standby pressure control. On the other hand, when the gear shift progress determination is "ON" (S34: Yes), the gear shift processing unit 50 starts the torque phase control (S35).

When the torque phase control is ended, the gear shift processing unit 50 starts the inertia phase control (S36). When the inertia phase control is ended, the gear shift processing unit 50 starts the completion control (S37).

As described above, in the hydraulic control processing of the coupled-side friction coupling portion CB, the gear shift processing unit 50 maintains the hydraulic pressure of the coupled-side friction coupling portion CB under the standby pressure control and performs the subsequent control when the gear shift progress determination is "ON", so that the inertia change occurs at the target engine rotation speed.

Figure 16:
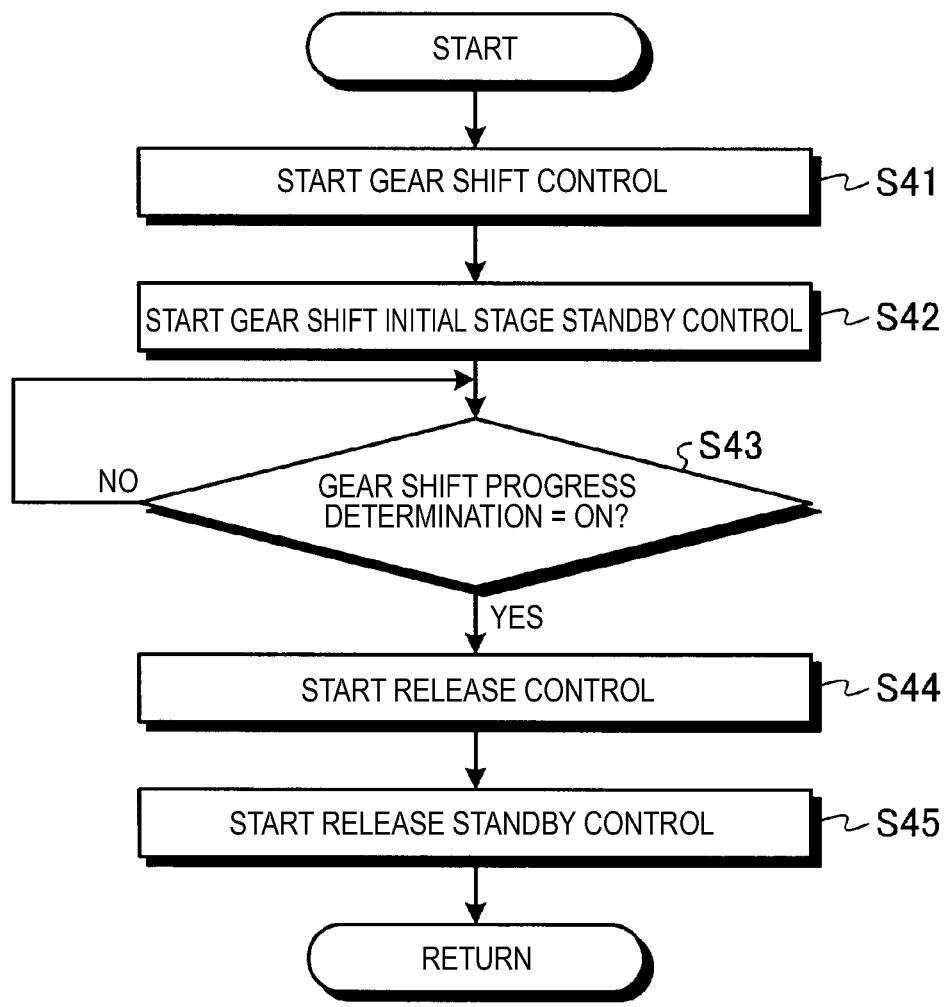
FIG. 16 is a flowchart showing a hydraulic control processing of a released-side friction coupling portion executed by the gear shift processing unit of the gear shift control device according to the embodiment.

FIG. 16 is a flowchart showing a hydraulic control processing of the released-side friction coupling portion executed by the gear shift processing unit 50 of the gear shift control device 7 according to the embodiment.

As shown in FIG. 16, when gear shift control on the released side is started (S41), the gear shift processing unit 50 starts the gear shift initial stage standby control (S42). When the gear shift progress determination is not "ON", that is, when the gear shift progress determination is "OFF" (S43: No), the gear shift processing unit 50 continues the gear shift initial stage standby control. On the other hand, when the gear shift progress determination is "ON" (S43: Yes), the gear shift processing unit 50 starts the release control (S44). When the release control is ended, the gear shift processing unit 50 starts the release standby control (S45).

As described above, in the hydraulic control processing of the released-side friction coupling portion CB, the gear shift processing unit 50 maintains the hydraulic pressure of the released-side friction coupling portion CB under the gear shift initial stage standby control and performs the subsequent control when the gear shift progress determination is "ON", so that the inertia change occurs at the target engine rotation speed.

Next, the processing of the embodiment will be described in comparison with a processing of a comparative example with reference to FIGS. 17 and 18.

FIG. 17 is a timing chart showing the processing of FIG. 11 executed by the gear shift processing unit 50 of the gear shift control device 7 according to the embodiment and a processing according to the comparative example, and is a diagram when the change rate of the rotation speed of the engine 1 is reduced during the gear shift control. FIG. 18 is a timing chart showing the processing of FIG. 11 executed by the gear shift processing unit 50 of the gear shift control device 7 according to the embodiment and a processing according to the comparative example, and is a diagram when the change rate of the rotation speed of the engine 1 is increased during the gear shift control. Lines L20a and L20b in FIGS. 17 and 18 are the engine rotation speeds of the embodiment and the comparative example, respectively. A line L21a indicates an expected rotation speed of the engine 1 (hereinafter, also called an expected engine rotation speed) calculated by the change rate of the rotation speed of the engine 1 at the time point when the gear shift progress determination is ON (time point t4) in the embodiment. A line L21b indicates an expected engine rotation speed calculated by the change rate of the rotation speed of the engine 1 at the time point when a gear shift determination is made in the comparative example.

The processing of the comparative example is different from the processing of FIG. 11 of the embodiment in that no pin charge control is performed and a method of calculating the inertia phase start time is different. In the processing of the comparative example, a time from a gear shift control start time point (time point t0) to an estimated inertia phase change start time point (time point t41) is set as an inertia phase start time. In contrast, in the example of FIG. 11 of the embodiment, as described above, the time from the torque phase control start time point (time point t4) to an estimated inertia phase change start time point (time point t31) is set as the inertia phase start time.

FIG. 17 shows an example in which the change rate (acceleration) of the rotation speed of the engine 1 is reduced after the gear shift determination (time point t0) is performed. In this case, in the comparative example, since preparation control (the precharge control and standby control) for shifting the friction coupling portion CB is performed after the gear shift determination is performed, it takes time from when the gear shift determination is performed to when the friction coupling portion CB is actually shifted. Therefore, in the comparative example, since a deviation (F1b in FIG. 17) between the actual rotation speed of the engine 1 and the expected engine rotation speed is relatively large, the engine rotation speed at the start of the inertia phase may deviate relatively largely from the target engine rotation speed.

In contrast, in the embodiment, since the gear shift progress determination is performed during the standby control after the precharge control is ended, a deviation (F1a in FIG. 17) between the actual rotation speed of the engine 1 and the expected engine rotation speed is relatively small, and the large deviation of the engine rotation speed at the start of the inertia phase from the target engine rotation speed can be prevented.

FIG. 18 shows an example in which the change rate (acceleration) of the rotation speed of the engine 1 is increased after the gear shift determination (time point t0) is performed. In this case, in the embodiment, since the start of the gear shift control is determined based on the shift line H, and the precharge control of the gear shift preparation control is ended before the gear shift progress determination, even when the change rate of the rotation speed of the engine 1 is increased during the gear shift control, the control subsequent to the torque phase control can be executed earlier. Therefore, the engine rotation speed at the start of the inertia phase is easily matched with the target engine rotation speed.

As can be seen from above, in the example of FIG. 11, the following processing is performed. That is, the timing of the inertia phase start is adjusted after the start of the gear shift control. After the gear shift control is started according to the gear shift determination, in a state in which the gear shift preparation control (precharge control, standby pressure control, and the like) is ended, that is, in a state in which the coupled-side friction coupling portion CB completes the movement (stroke) of the piston 33, a control state is maintained in a state in which the hydraulic pressure of the released-side friction coupling portion CB is decreased to a hydraulic pressure at which the friction coupling portion CB can keep the torque capacity. Then, at a stage when an estimated engine pressure rotation speed at the start of the inertia phase (the maximum engine rotation speed during the gear shift) is the target engine rotation speed, the control subsequent to the torque phase control is executed.

After the gear shift control is started, the maximum engine rotation speed is stored. After the gear shift control is started according to the gear shift determination, the estimated engine rotation speed at the start of the inertia phase is calculated.

The inertia phase start time is learned for each shift stage. When the maximum engine rotation speed during the gear shift exceeds a target range, the inertia phase start time is extended, and when the maximum engine rotation speed during the gear shift falls below the target range, the inertia phase start time is shortened. In the above example, the calculation of the estimated engine rotation speed at the start of the inertia phase is performed according to the equation (1), but is not limited thereto. For example, the calculation of the estimated engine rotation speed at the start of the inertia phase may be performed according to the following equations (2) and (3).

Estimated engine rotation speed at start of inertia phase=(engine rotation speed)+(inertia phase start time)×(change rate of engine rotation speed) (2)

Estimated engine rotation speed at start of inertia phase=(rotation speed of output shaft 2b)×(current gear ratio)+(inertia phase start time)× (change rate of rotation speed of output shaft 2b)×(current gear ratio)+estimated slip amount (3)

As described above, the gear shift control device 7 for the transmission 2 of the embodiment includes, for example, the determination unit 52 that determines the change of the shift stage, and the output unit 53 that sets the target value of the hydraulic pressure and outputs the target value to the hydraulic control device 8. The output unit 53, when the determination unit 52 determines to change the shift stage from a certain shift stage to another shift stage, increases the target value for the coupled-side friction coupling portion CB (first friction coupling portion), which is the friction coupling portion CB in the decoupled state in the certain shift stage, to the coupled-side instruction hydraulic pressure Pr1 (first value), then reduces the target value to the coupled-side instruction hydraulic pressure Pr2 (second value) which is smaller than the coupled-side instruction hydraulic pressure Pr1 and at which the decoupled state of the coupled-side friction coupling portion CB is maintained, after the target value is reduced to the coupled-side instruction hydraulic pressure Pr2, increases the target value to the coupled-side instruction hydraulic pressure Pr3 (third value) that is larger than the coupled-side instruction hydraulic pressure Pr2, after the target value is increased to the coupled-side instruction hydraulic pressure Pr3, sets the target value to the coupled-side instruction hydraulic pressure Pr4 (fourth value) that is smaller than the coupled-side instruction hydraulic pressure Pr3, and after the target value is set to the coupled-side instruction hydraulic pressure Pr4, sets the target value to the coupled-side instruction hydraulic pressure Pr5 (fifth value) that is equal to or larger than the coupled-side instruction hydraulic pressure Pr4 and that generates the frictional force, and the output unit 53 sets the coupled-side instruction hydraulic pressure Pr4 according to magnitude of the input torque to the transmission 2.

Therefore, according to the gear shift control device 7, for example, even if the setting of the coupled-side instruction hydraulic pressure Pr5 changes according to the input torque from the engine 1 to the transmission 2, the coupled-side instruction hydraulic pressure Pr2 can be kept constant. Therefore, it is easy to identify a cause of a shift shock. In addition, it is easy to make the time required for the torque phase control constant. That is, a difference between an estimated value of the rotation speed of the engine 1 at the start of the inertia phase, which is estimated using a torque phase control time, and the actual rotation speed of the engine 1 is less likely to be generated.

In the gear shift control device 7, for example, the output unit 53 determines whether to change the target value to the coupled-side instruction hydraulic pressure Pr3 while the target value is set to the coupled-side instruction hydraulic pressure Pr2.

Therefore, according to the gear shift control device 7, for example, the rotation speed of the engine 1 connected to the transmission 2 at the start of the inertia phase can be easily matched with (easily approached to) the target rotation speed of the engine 1.

The gear shift control device 7 includes, for example, the acquisition unit 51 that acquires the accelerator opening degree indicating the operation amount of an accelerator member of the engine 1 that outputs the power to the transmission 2. When the accelerator opening degree acquired by the acquisition unit 51 is equal to or higher than the threshold value, the output unit 53 determines whether to change the target value to the coupled-side instruction hydraulic pressure Pr3 while the target value is set to the coupled-side instruction hydraulic pressure Pr2. When the accelerator opening degree acquired by the acquisition unit 51 is less than the threshold value, the output unit 53 does not determine whether to change the target value to the coupled-side instruction hydraulic pressure Pr3 while the target value is set to the coupled-side instruction hydraulic pressure Pr2.

Therefore, according to the gear shift control device 7, for example, when the accelerator opening degree is equal to or higher than the threshold value, the rotation speed of the engine 1 at the start of the inertia phase can be easily matched with (easily approached to) the target rotation speed of the engine. The processing of the output unit 53 when the accelerator opening degree acquired by the acquisition unit 51 is less than the threshold value is not limited to the above. For example, when the accelerator opening degree acquired by the acquisition unit 51 is less than the threshold value, the output unit 53 may not determine whether to change the target value to the coupled-side instruction hydraulic pressure Pr3 for a predetermined time after the target value is set to the coupled-side instruction hydraulic pressure Pr2, and may make the determination after elapsing of the predetermined time.

Here, the actual hydraulic pressure follows the instruction hydraulic pressure with a delay, in order to shorten the delay of the following, there is a technique of setting the instruction hydraulic pressure larger. However, if the instruction hydraulic pressure is set high, for example, when the friction coupling portion in the decoupled state is brought into the coupled state, the frictional force is generated in the friction coupling portion during a period in which the decoupled state is maintained, so that wear and the like of the friction coupling portion are generated and durability of the friction coupling portion is reduced. In contrast, according to the gear shift control device 7 of the embodiment, for example, the decoupled state of the coupled-side friction coupling portion CB is maintained while the target value is set to the coupled-side instruction hydraulic pressure Pr2 (under the standby pressure control). Therefore, since no frictional force is generated in the coupled-side friction coupling portion CB during this period, it is possible to prevent a decrease in the durability of the friction coupling portion CB.

In the gear shift control device 7, for example, after reducing the hydraulic pressure target value to the coupled-side instruction hydraulic pressure Pr2, the output unit 53 temporarily increases the target value to the coupled-side instruction hydraulic pressure Pr3 that is larger than the coupled-side instruction hydraulic pressure Pr2.

Therefore, according to the gear shift control device 7, for example, since the target value is temporarily increased to the coupled-side instruction hydraulic pressure Pr3 that is larger than the coupled-side instruction hydraulic pressure Pr2, followability of the actual hydraulic pressure to the target value of the hydraulic pressure after the coupled-side instruction hydraulic pressure Pr3 is temporarily increased can be improved.

In the above embodiment, the processing of FIG. 7 is executed when the actual accelerator opening degree is less than the prescribed threshold value, and the processing of FIG. 11 is executed when the actual accelerator opening degree is equal to or higher than the prescribed threshold value, but this disclosure is not limited thereto. For example, the processing of FIG. 7 may be executed regardless of the actual accelerator opening degree. The processing of FIG. 11 may be executed regardless of the actual accelerator opening degree.

In the above embodiment, the output unit 53 sets the coupled-side instruction hydraulic pressure Pr4 (fourth value) according to only the magnitude of the input torque to the transmission 2, but this disclosure is not limited thereto. For example, the output unit 53 may set the coupled-side instruction hydraulic pressure Pr4 according to the magnitude of the input torque to the transmission 2 and the coupled-side instruction hydraulic pressure Pr2 (second value). Specifically, the output unit 53 sets each of the coupled-side instruction hydraulic pressure Pr5 (fifth value) (for example, each of the lines L1a to L1f in FIG. 9). With respect to the threshold value which is a design theoretical value or the coupled-side instruction hydraulic pressure Pr2 (second value) determined from previous gear shift or the like, the lower the coupled-side instruction hydraulic pressure Pr2 (second value) during the actual gear shift control, the larger the coupled-side instruction hydraulic pressure Pr4 (fourth value) is set, and the higher the coupled-side instruction hydraulic pressure Pr2 (second value) during the actual gear shift control, the smaller the coupled-side instruction hydraulic pressure Pr4 (fourth value) is set. Accordingly, even if the coupled-side instruction hydraulic pressure Pr2 (second value) is not stable due to control variation or the like, the actual hydraulic pressure can follow the coupled-side instruction hydraulic pressure Pr5 (fifth value), which is the target value, more quickly. That is, when the coupled-side instruction hydraulic pressure Pr2 (second value) is lower than the predetermined value, if the coupled-side instruction hydraulic pressure Pr4 (fourth value) is not excessively decreased, the coupled-side instruction hydraulic pressure Pr5 (fifth value) is easily to be reached.

An aspect of this disclosure provides a gear shift control device for an automatic transmission device including a transmission that includes a plurality of friction coupling portions which change, according to a hydraulic pressure, between a coupled state in which a first coupling target and a second coupling target are coupled by frictional force and a decoupled state in which the first coupling target and the second coupling target are decoupled and that has a plurality of shift stages corresponding to combinations of the coupled states and the decoupled states of the plurality of friction coupling portions, and a hydraulic control device that controls the hydraulic pressure, the gear shift control device includes, for example, a determination unit that determines a change of the shift stage; and an output unit that sets a target value of the hydraulic pressure and outputs the target value to the hydraulic control device, the output unit, when the determination unit determines to change the shift stage from a certain shift stage to another shift stage, increases the target value for a first friction coupling portion, which is the friction coupling portion in the decoupled state in the certain shift stage, to a first value, then reduces the target value to a second value that is smaller than the first value, increases the target value to a third value that is larger than the second value after the target value is reduced to the second value, sets the target value to a fourth value that is smaller than the third value after the target value is increased to the third value, and sets the target value to a fifth value that is equal to or larger than the fourth value and that generates the frictional force after the target value is set to the fourth value, and the output unit sets the fourth value according to magnitude of input torque to the transmission.

Therefore, according to the gear shift control device, for example, even if the setting of the fifth value changes according to the input torque from the engine to the transmission, the second value can be kept constant. Therefore, it is easy to identify a cause of a shift shock.

In the gear shift control device, for example, the output unit determines whether to change the target value to the third value while the target value is set to the second value.

Therefore, according to the gear shift control device, for example, a rotation speed of the engine connected to the transmission at a start of an inertia phase can be easily matched with (easily approached to) a target rotation speed of the engine.

The gear shift control device includes, for example, an acquisition unit that acquires an accelerator opening degree indicating an operation amount of an accelerator member of an engine that outputs power to the transmission, and when the accelerator opening degree acquired by the acquisition unit is equal to or higher than a threshold value, the output unit determines whether to change the target value to the third value while the target value is set to the second value.

Therefore, according to the gear shift control device, for example, when the accelerator opening degree is equal to or higher than the threshold value, the rotation speed of the engine connected to the transmission at the start of the inertia phase can be easily matched with (easily approached to) the target rotation speed of the engine.

While a certain embodiment disclosed here is described, the embodiment is presented by way of example only, and is not intended to limit the scope of the disclosure. These novel embodiments can be implemented in various other forms, and various omissions, substitutions and changes can be made without departing from the spirit of the disclosure. These embodiments and modifications thereof are included in the scope and gist of this disclosure, and are also included in the disclosure described in the claims and equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A gear shift control device for an automatic transmission device including
    a transmission that includes a plurality of friction coupling portions which change, according to a hydraulic pressure, between a coupled state in which a first coupling target and a second coupling target are coupled by frictional force and a decoupled state in which the first coupling target and the second coupling target are decoupled and that has a plurality of shift stages corresponding to combinations of the coupled states and the decoupled states of the plurality of friction coupling portions, and
    a hydraulic control device that controls the hydraulic pressure,
    the gear shift control device for an automatic transmission device comprising:
    a determination unit that determines a change of the shift stage; and
    an output unit that sets a target value of the hydraulic pressure and outputs the target value to the hydraulic control device, wherein
    the output unit, when the determination unit determines to change the shift stage from a certain shift stage to another shift stage, increases the target value for a first friction coupling portion, which is the friction coupling portion in the decoupled state in the certain shift stage, to a first value, then reduces the target value to a second value that is smaller than the first value, increases the target value to a third value that is larger than the second value after the target value is reduced to the second value, sets the target value to a fourth value that is smaller than the third value after the target value is increased to the third value, and sets the target value to a fifth value that is equal to or larger than the fourth value and that generates the frictional force after the target value is set to the fourth value, and
    the output unit sets the fourth value according to magnitude of input torque to the transmission.

* * * * *